United States Patent
Masters et al.

(10) Patent No.: US 6,494,476 B2
(45) Date of Patent: Dec. 17, 2002

(54) ROBOTIC VEHICLE THAT TRACKS THE PATH OF A LEAD VEHICLE

(76) Inventors: Nathan Eugene Masters, 3168 Hwy 308, Raceland, LA (US) 70394; Andrew C. Masters, 3168 Hwy 308, Raceland, LA (US) 70394; Connie Ruby Masters, 3168 Hwy 308, Raceland, LA (US) 70394

( * ) Notice: Subject to any disclaimer, the term of this patent is extended or adjusted under 35 U.S.C. 154(b) by 0 days.

(21) Appl. No.: 09/873,854

(22) Filed: Jun. 4, 2001

(65) Prior Publication Data

US 2001/0054524 A1 Dec. 27, 2001

Related U.S. Application Data

(60) Provisional application No. 60/208,968, filed on Jun. 2, 2000.

(51) Int. Cl.[7] .......................... B62D 12/00; B62D 53/06; B62D 13/00
(52) U.S. Cl. ...................... 280/426; 280/419; 280/442; 280/455.1; 701/41
(58) Field of Search .............................. 230/423.1, 426, 230/419, 476.1, 442, 455.1; 180/418–420; 701/41–44

(56) References Cited

U.S. PATENT DOCUMENTS

| | | | |
|---|---|---|---|
| 5,244,226 A | 9/1993 | Bergh | |
| 5,329,451 A | 7/1994 | Ikuzou Notsu | |
| 5,523,947 A | * 6/1996 | Breen | ......................... 280/426 |
| 5,996,722 A | 12/1999 | Price | |
| 6,285,923 B1 | * 9/2001 | Matsuda et al. | .............. 701/41 |

* cited by examiner

Primary Examiner—Anne Marie Boehler
Assistant Examiner—Matthew Luby

(57) ABSTRACT

A method and apparatus for controlling the steering of a trailing section of a multi-sectioned vehicle is described. The trailing section follows the path of the first section. Data is acquired by a controller from sensors on the various sections. The controller then processes this data, generating a configuration needed for the controller-steered wheels to follow a path approximately equivalent to the path taken by the first steered section. Power is then applied by some means to steer these controller-steered wheels, forcing them into the desired configuration. The complexity of the control system can be varied with different algorithms providing alternative steering patterns as desired. This system can be extended with more trailing sections without necessitating more than minor changes to the control algorithms.

21 Claims, 14 Drawing Sheets

ROBOTIC VEHICLE THAT TRACKS THE PATH OF A LEAD VEHICLE

CROSS-REFERENCE TO RELATED APPLICATIONS

This application claims the benefit of provisional patent No. 60/208,968, filed on Jun. 2, 2000.

TECHNICAL FIELD

This invention relates generally to the steering of the various sections of mobile articulated machines, and particularly to the steering of a section that is steered as a robot by a non-human control system. The preferred embodiments of the invention demonstrate a way of applying the principles of the invention to over-the-road tractor-trailer combinations. A driver controls the steering of a lead tractor, which carries the first trailer.

BACKGROUND OF THE INVENTION

Over-the-road transport companies find it difficult at times to compete with other freight haulers due to labor costs. Labor costs could be decreased if each tractor-trailer rig could carry more weight, but weight limits have been placed on roads and bridges for structural reasons. Multi-trailer arrangements have been seen as a possible solution to this problem because they spread the load over a longer stretch of pavement and reduce the columnar loading on bridges. These arrangements generally involve long combination vehicles, a semi-trailer carried by the tractor with one or more full trailers composed of semi-trailers carried by dollies, called "doubles" and "triples".

These long combination vehicles face the two interconnected problems of instability and lack of maneuverability, with each following dolly (with trailer attached) becoming less stable at speed and, also, each following dolly "cutting the corner" more than the vehicle segment in front of it during cornering. The standard Type A dolly has achieved some degree of success over the years by striking a point between the two problems. It hitches to the towing vehicle or first trailer using a single point hitch. The standard Type A dolly provides steering for the trailer it is carrying by allowing the entire dolly to steer relative to its semi-trailer about the fifth wheel vertical axis on the dolly as well as relative to the towing trailer about the single point hitch vertical axis. The dolly tires however, do not steer relative to the dolly frame.

Commercial vehicles of either truck and full trailer or multi-trailer configurations which employ the standard Type A dollies generally possess undesirable characteristics such as limited maneuverability and instabilities caused by rearward amplification. Rearward amplification, sometimes described as a crack-the-whip phenomenon, implies that in rapid evasive maneuvers such as emergency lane changes, the rearward elements of the vehicle train such as the dolly and the trailer carried by the dolly experience motions which are substantially amplified compared to the motions of the towing tractor and first trailer. Rearward amplification is known to be the basic cause of many accidents in which roll over of the last trailer or second trailer occurs while the remaining elements of the vehicle remain unscathed.

A second general class of dollies known as Type B dollies represents an improvement over standard Type A dollies. Type B dollies are generally characterized by a double tow bar arrangement, which eliminates steering of the dolly with respect to the towing vehicle, most commonly the first trailer. The Type B dollies have been effective to a degree against some of the instability problems and are slightly more maneuverable than the standard Type A dollies. However, they cause other problems such as introducing other types of instabilities, causing stresses on the rear of the forward trailer, and increasing unloading delays due to difficulty in accessing the back of the forward trailer for some configurations.

Steerable Type A dollies address the stability problems, but are even less maneuverable than Standard Type A dollies.

The long dolly of provisional patent No. 60/204,513 addressed these problems by switching between a stability and a cornering or maneuverability mode. The application of drive power to the dolly axles, provisional patent Ser. No. 09/776,211 did not change the steering but did allow the long dolly (with its trailer attached) to swing wider around a corner in the path dictated by steering modes that demanded a closer emulation of the behavior of the tractor.

Although an improvement, these modes of steering for the long dollies, stability and cornering, did not truly track the path of the tractor, but only traced a path that represented a typical expected path for a given maneuver. Clearly a mode of steering is needed for these long combination vehicles that would ensure that the following vehicle tracked the path of the forward vehicle as closely as possible, especially during critical cornering maneuvers in tight places.

A similar problem exists in narrow city streets where equipment must be delivered to an emergency site such as a fire, or where the delivery of other materials is required. A sectioned vehicle in which each short section followed the path of the first section would be better able to negotiate such streets than a single long vehicle. Similarly, in a convoy of RV's traveling together, each vehicle requires a driver. If a mode of path tracking steering existed which would assure that successive vehicles followed the same path as the lead vehicle, a single driver might steer a convoy of several vehicles.

SUMMARY OF THE INVENTION

The present invention advances the concept of a robotic vehicle that is capable of tracking the path of a lead vehicle. At this point the device can no longer be considered a mere dolly but must more properly be called a robotic vehicle or robotic tractor, because it is fully capable of steering itself in response to input and of propelling itself during cornering. It is also capable of selecting other desired steering modes, including, for example, a mode in which the stability is enhanced at a slight expense to its tracking capability.

The details of this robotic tractor include mathematical equations and algorithms, electronic hardware, and a mechanical system.

OBJECTIVES OF THE INVENTION

It is an objective of this invention to advance the concept of a robotic vehicle that is capable of tracking the path of a lead vehicle, and that is fully capable of steering itself in response to input, of propelling itself during cornering, and of selecting other desired steering modes, including, for example, a mode in which the stability is enhanced at a slight expense to its tracking capability.

It is an objective of this invention to present a mathematical model that would allow a multiplicity of path-tracking and non-path-tracking steering algorithms to be combined in a coherent manner using a variety of weighting factors, and to point toward even more complex control algorithms.

It is an objective of this invention to provide a plurality of mathematical algorithms based on physical principles and on the geometry of the vehicle configurations, each of which is compatible with the above system for combining algorithms, for steering a robotic vehicle to track the path of a lead vehicle.

It is an objective of this invention to present an electronic control system, preferably including hardware such as sensors, actuators, and other I/O devices, RAM, ROM, and other data storage devices, and digital processors, that is capable of acquiring data from these sensors, using that data as input to algorithms to generate control signals, and using these control signals to activate steering and other control components to enable a robotic vehicle to track the path of a lead vehicle.

It is an objective of this invention to present a mechanical system that is capable of being controlled by the actuators to track the path of the lead vehicle, thereby eliminating the need for a second operator for the second vehicle.

ADVANTAGES OF THE INVENTION

The first advantage of this invention is the increase in maneuverability for shorter sectioned delivery or emergency vehicles in places such as narrow city streets. The long wheelbases of standard trucks and tractor-trailer combinations cause them to "cut the corner" during turns. In narrow city streets such as those found in many European cities, this behavior could be disastrous. A vehicle composed of a number of shorter sections that were steered so that each section tracked the first section could solve some of the problems in these types of situations.

Another advantage of this invention is the savings in labor costs in applications such as over-the-road freight transport. The length of the robotic tractor spreads the load and permits more weight to be carried by a single long combination vehicle driven by a single driver. A robotic tractor "double" eliminates one driver, and a robotic tractor "triple" eliminates two drivers. At the same time, because of the ability of the robotic tractor(s) to track the path of the lead tractor while carrying its own trailer, the loss of maneuverability is minimal. Because of the length and because of the capability for using a more stable mode at higher speeds, there is also no appreciable loss of stability as compared to a single tractor-trailer rig.

Another advantage of this invention is that it requires minimal supervision from the driver. The controller is programmed to steer using input from its sensors (such as speed of travel or quickness of a turn), and by taking clues from the normal control activities of the driver. To set up the long combination vehicle, the driver has only to adjust the length of the tongue and input the length of the tractor and the trailers.

Another advantage of this invention is that the robotic tractor embodiment can carry standard semi-trailers with only very minor modifications. Standard tractors could also be used as lead tractors with only slightly more substantial modifications, such as the addition of the appropriate sensors.

This invention offers the stability of the steerable Type A dollies but with better cornering capabilities than the Type B dolly. It also takes advantage of the reduction in cost and the rapid growth in the capabilities of electronic computing hardware.

DETAILED DESCRIPTION

Figure 1:
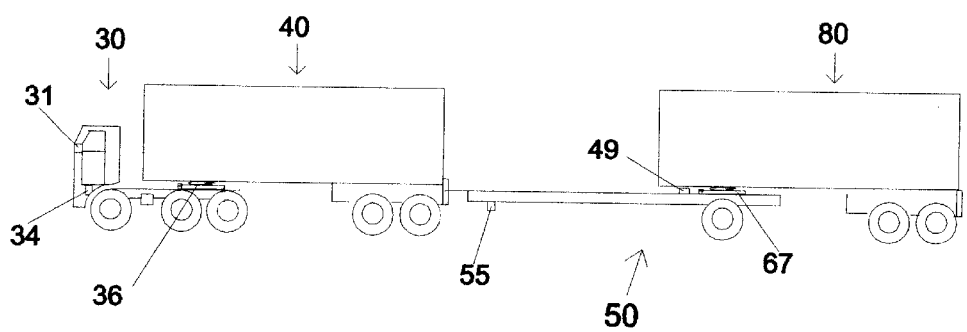
FIG. 1 is a diagrammatic view of a tractor-trailer long combination rig
Figure 2:
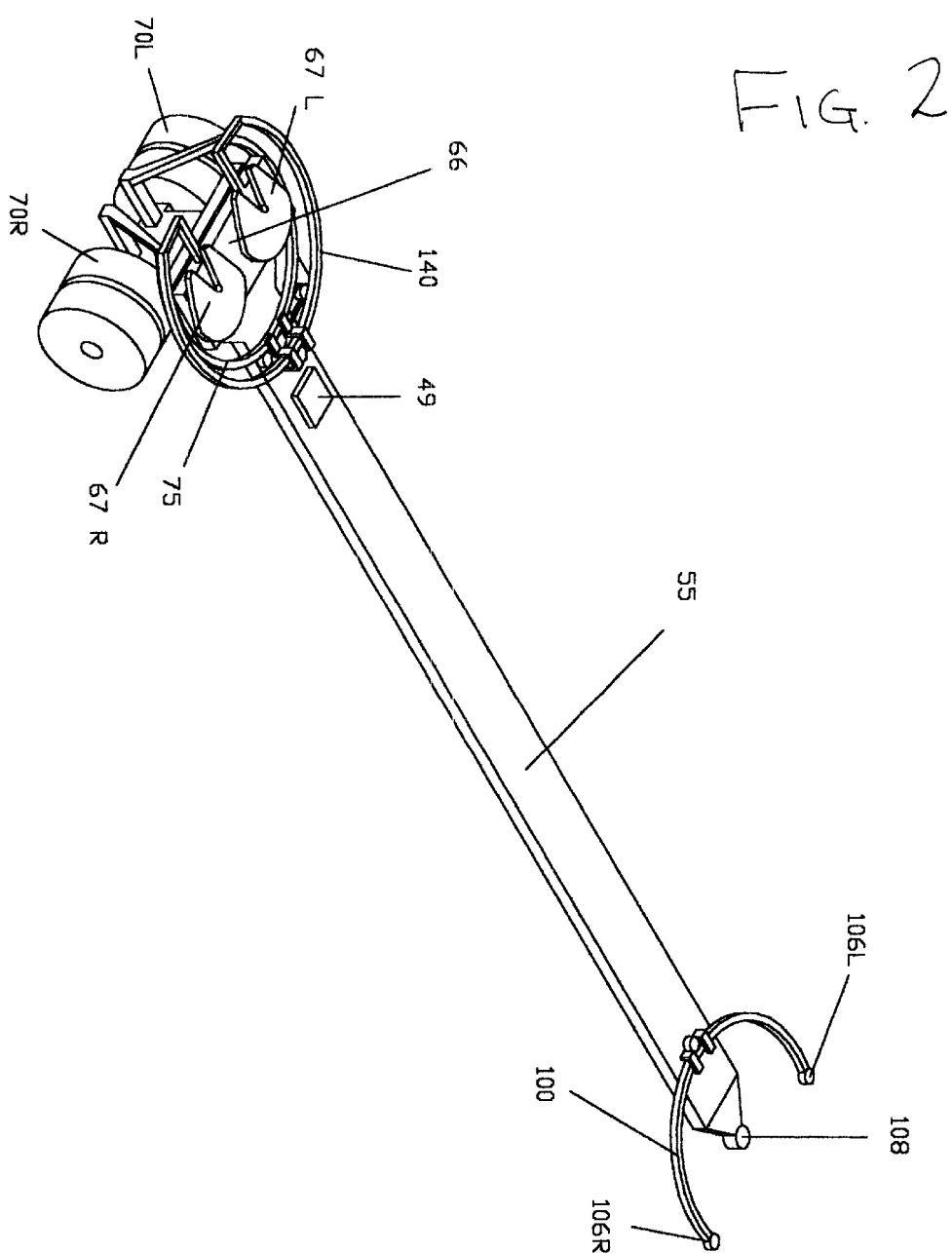
FIG. 2 is a diagrammatic perspective plan view of a robotic tractor according to one embodiment of the articulated machine of the present invention

A system for steering a trailing section of an articulated machine is shown as embodied in a tractor-trailer combination rig, but other articulated machines are considered equivalents and within the scope of the invention. In FIG. 1 a tractor-trailer combination rig having first, second, third and fourth pivotally connected articulated machine sections is shown as a tractor 30, forward trailer 40, robotic tractor 50, and rear trailer 80. Information is obtained from the various sensors and input to a controller 49, which can be a processor or computer. The controller 49 uses algorithms to extract necessary information about orientation, speed, etc. from the input data, and then determines the necessary action to obtain the desired steering result.

Three steering algorithms are described. The relative angle steering mode and the rate of orientation change steering mode are methods of path tracking steering. The third method, variable ratio with oversteer from provisional patent No. 60/204,513 is an independent mode. The traction kinking system is included from provisional patent Ser. No. 09/776,211. Full redundancy for all the electronic components would be desirable to minimize the consequences of failures, but for simplicity such redundancy is not included in this description of the invention. Energy must be supplied to power the robotic tractor 50 steering system and traction kinking system. Various means, including air, hydraulic, or electric power or a combustion engine would suffice. In this embodiment compressed air and pressurized hydraulic fluids are utilized as energy sources.

Figure 14:
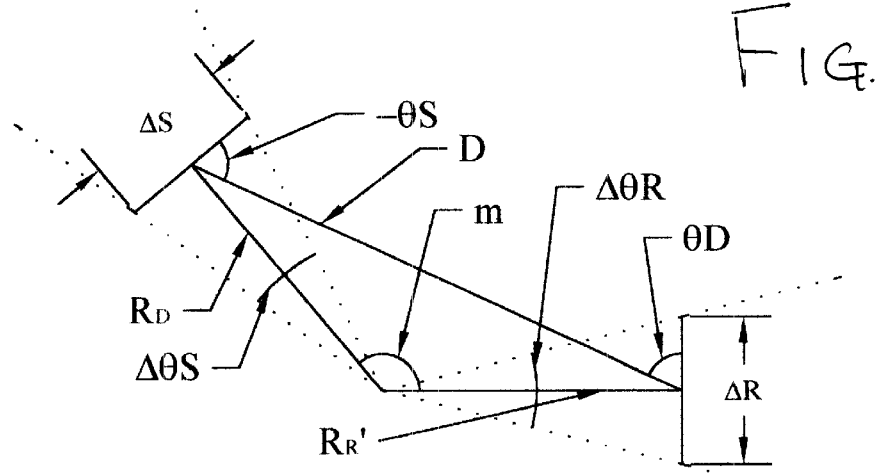
FIG. 14 is a diagrammatic representation of a lead tractor and trailer making a turn

Three embodiments are described. A simpler embodiment is shown in FIGS. 1 through 7 as a robotic tractor with a single steering mode, the relative angle path-tracking mode. The second, more complex, embodiment utilizes both the relative angle path tracking mode and the rate of orientation change path tracking mode as well as the independent ratio with oversteer steering mode, shown in 1, 7, 8, 9, 11, 12, and 13. This embodiment also uses traction kinking to assist in swinging wide around corners. The third embodiment, a double axle wagon, towed behind a pickup truck or other small vehicle, is shown in FIG. 14.

FIG. 1 illustrates a typical application of a robotic tractor with its attached trailer towed behind a tractor-trailer combination rig, as in the first and second embodiments. A lead tractor 30 of a tractor-trailer combination has a first trailer 40 coupled thereto via a pair of fifth wheels 36 L, R. Behind this first trailer 40 is attached the steerable machine section that we refer to as the robotic tractor 50. A second trailer 80 is mounted on the robotic tractor 50 by another pair of fifth wheels 67 L, R.

Two sensors are mounted on the tractor 30 to determine reference steering information about the path the lead tractor 30 has traveled in the first embodiment. This reference steering information for the path tracking steering modes comes from a sensor $\theta_{R0}$ 42 (FIG. 7) mounted on the tractor partial circular track 250 between the tractor 30 and the front trailer 40 to determine the angle $\theta_{R0}$ between the tractor 30 and the front trailer 40, and linear motion sensor ΔT 34 (FIG. 1) mounted on the tractor 30 in order to determine the distance traveled by the tractor 30. The rotation of the tractor drive shaft is utilized to obtain this measurement, but other methods could be used to obtain it. In the second embodiment a third sensor, $\theta_F$ 31 (FIG. 1), is located to sense the angle $\theta_F$ between the tractor 30 centerline and the centerline of the front wheels of the tractor 30.

FIRST EMBODIMENT

The first embodiment of the invention has a long rigid main robotic tractor frame or tongue 55, which is the central rigid structural member. The front of the tongue 55 is attached at hitch latch 108 to the forward trailer 40.

Figure 3:
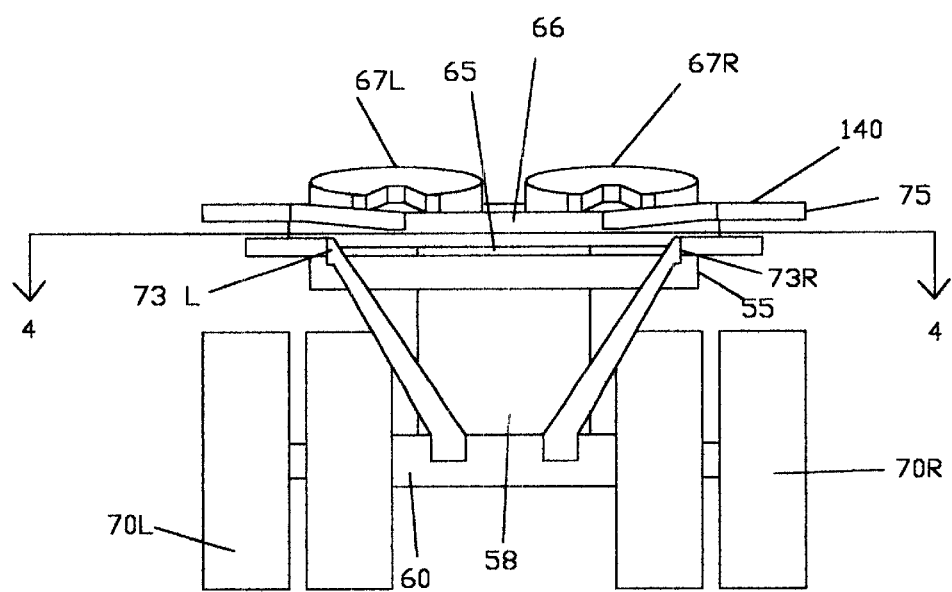
FIG. 3 is a diagrammatic back plan view of a robotic tractor according to one embodiment of the articulated machine of the present invention

At the rear of the robotic tractor there are three sections which each pivot in relation to each other, with a single vertical pivot point, best seen in FIG. 3. The uppermost section is a trailer mounting bar 66 with its two attached fifth wheels 67 L, R. The middle section is the robotic tractor frame or tongue 55. The lowest section is a steering axle assembly 60 with attached running wheels 70 L, R.

In the uppermost section, the trailer mounting bar 66 is free to swivel around the trailer mounting bar central pivot 65 (FIG. 3). This trailer mounting bar 66 pivots above the tongue 55 and around the same line as the steering axle assembly central pivot 58. Mounted on this trailer mounting bar 66 are the two fifth wheel latches 67 L, R by which the rear trailer 80 will be coupled to the robotic tractor in this embodiment, instead of the single fifth wheel coupling that is usually used. The trailer mounting bar 66 and the rear trailer 80 (FIG. 1) are allowed to pivot above the main robotic tractor frame 55 as the rear trailer 80 (FIG. 1) swings from side to side with respect to the robotic tractor. This movement is accurately measured and communicated to the processor 49 by the movement of the optical rotation encoder $\theta_{R1}$ 81 mounted adjacent to an upper partial-circular track 140.

The upper partial-circular track 140 attaches at an attachment assembly 141 at its endpoints to the trailer mounting bar 66 and pivots with it during turns. Bearing plates provide stability for this pivot 65. This upper partial-circular track 140 is mounted sufficiently above a rear partial-circular track 75 to easily clear it during operation and to allow unobstructed operation of both rotational systems.

Figure 4:
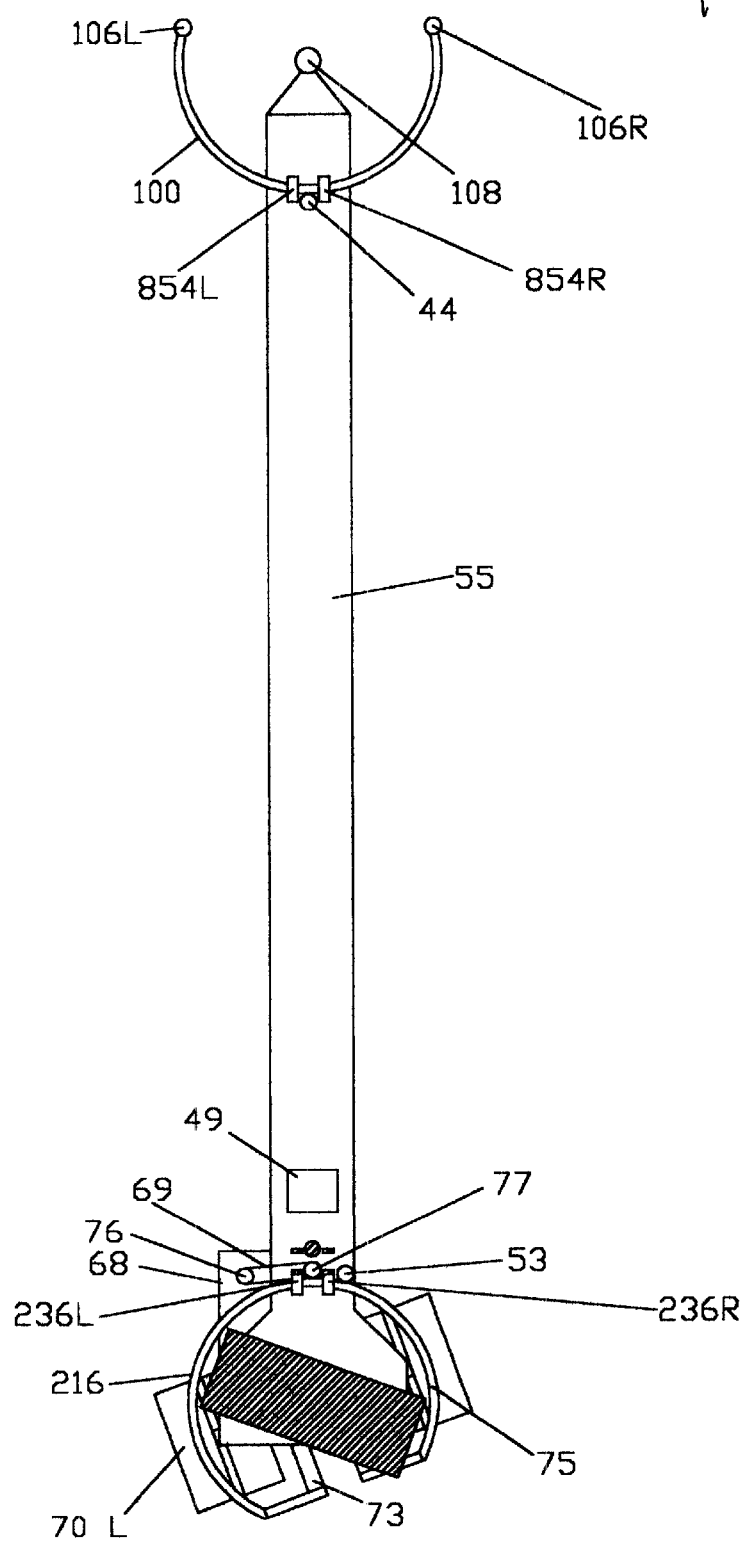
FIG. 4 is a diagrammatic top view taken along the lines 4—4 of FIG. 3 of a robotic tractor according to one embodiment of the articulated machine of the present invention
Figure 5:
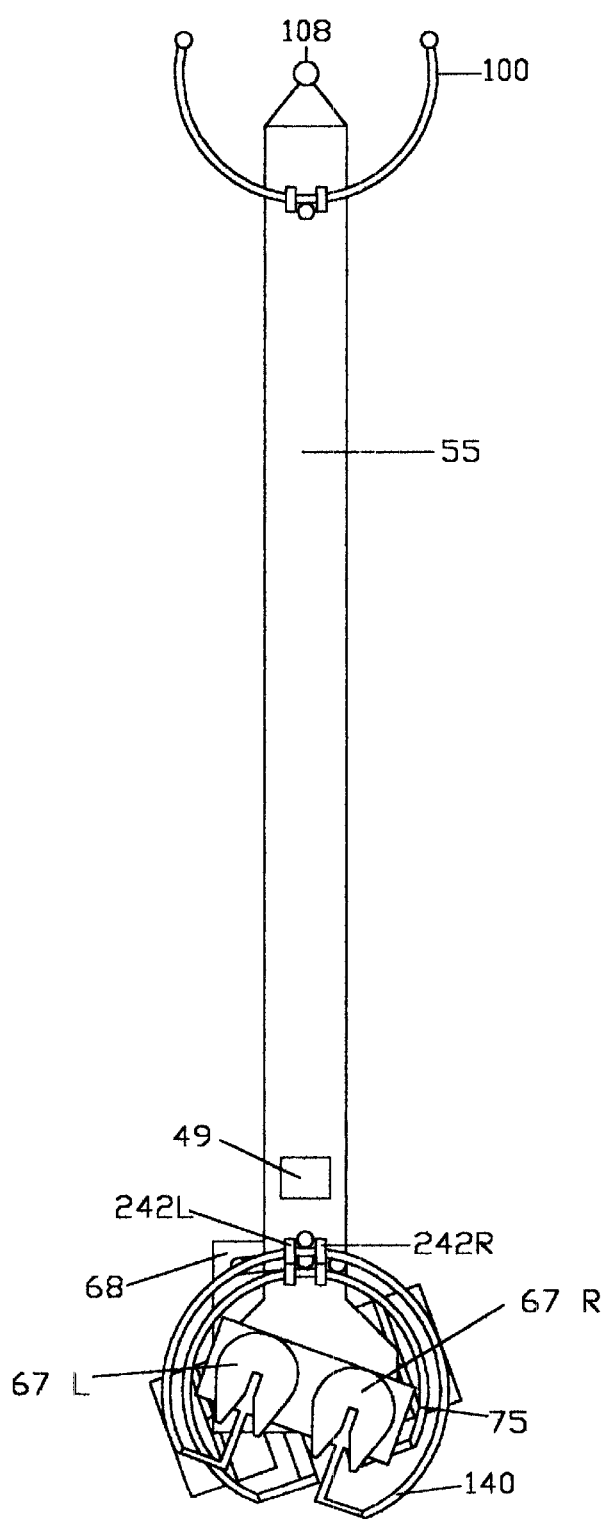
FIG. 5 is a diagrammatic top view of a robotic tractor according to one embodiment of the articulated machine of the present invention

The middle pivotal section of the robotic tractor 50 is the frame or tongue 55 (FIG. 3). Both the steering axle assembly 60 below the tongue 55, and the trailer mounting bar 66 above the tongue 55 are mounted on pivots extending downward and upward respectively from the tongue 55, and pivot with respect to the tongue 55. The tongue 55 is attached to the forward trailer 40 by a of some type. A front pivot orientation sensor $\theta_{D1}$ 44 (FIGS. 4,5) is mounted on the front partial circular track 100 to measure the angle $\theta_{D1}$ between the robotic tractor tongue 55 and the front trailer 40 centerline. The front partial circular track 100 is attached as shown in FIGS. 4 and 5 by ball type hitch latches 106 L, R that are attached to the front of the partial circular track 100, but other methods could be used.

Figure 6:
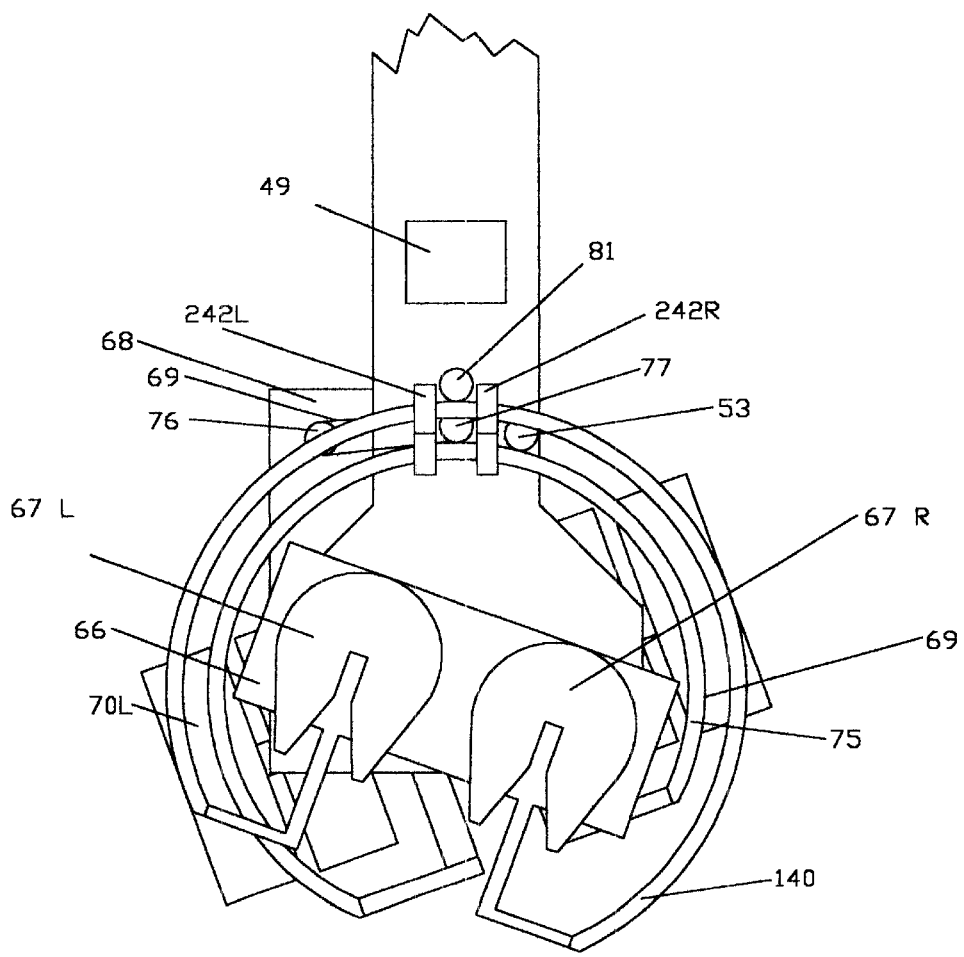
FIG. 6 is a diagrammatic close up of the rear section of atop view of a robotic tractor according to one embodiment of the articulated machine of the present invention

The axle assembly central pivot 58 (FIG. 3) is mounted on the bottom of the robotic tractor tongue, and a corresponding trailer mounting bar central pivot support 65 above the tongue 55 and in line vertically with the axle assembly pivot support 58 is the pivoting attachment for the trailer mounting bar 66. The axle assembly 58 pivots in relation to the robotic tractor tongue 55 in response to torque applied by a hydraulic steering motor 68 via a chain 69 (FIGS. 4, 6). The angle between the robotic tractor tongue 55 and the axle assembly 60 is read by a sensor $\theta_{S1}$ 53 (FIG. 4). The sensor $\theta_{S1}$ 53 obtains the angle between the robotic tractor tongue 55 and the axle assembly central pivot support 58 as shown in FIG. 4 by measuring the rotation of the lower partial circular track 75.

The tongue 55 of the robotic tractor will be longer than the typical dolly tongue 55, because if it is to correct for the deviation the trailer ahead of it caused it will need to be roughly on par with the length of the front trailer 40. The degree of similarity in length will depend on various factors; the longer the robotic tractor tongue 55, the easier it will be to correct the course deviation, but the more awkward the assembly will be. A short tongue would allow a degree of course correction, and how short the tongue can be made will depend on how accurately the robotic tractor 50 is desired to follow the path of the main trailer 40. The long tongue provides an advantage in that the length of the tongue would allow the vehicle to carry more weight, because the weight characteristics would be more like two tractor-trailer rigs in close convoy, rather than one tractor towing two trailers. By spreading the load over a longer span, this extra length has the highly desirable benefits of reducing the stresses on the pavements and reducing the columnar loading on the bridges of our highway systems, thus allowing a heavier load to be pulled.

The lower pivotal section is a steering axle assembly 60 with attached running wheels 70 L, R. The steering axle assembly 60 is mounted on the vertical axle central pivot 58 (FIG. 3) which extends below the main robotic tractor frame or tongue 55 and is able to swivel around on this axle central pivot 58 (FIG. 3). Bearing plates provide stability for this axle central pivot 58.

The steering axle assembly 60 and two spaced pairs of running wheels 70R and 70L, which it carries, are mounted beneath the main robotic tractor frame 55 along with any conventional suspension system components that may be needed. In this embodiment the suspension system is omitted for clarity of illustration since it is composed of standard assemblies. A double-axle steering section that turns as a unit, two independent steering axles, or any other suitable configuration would be possible, but, for simplicity, this embodiment of the invention is shown with a single axle.

The sensor assemblies and the hydraulic motor assemblies, which enable the controlling processor to steer the steering axle assembly 60, are mounted generally above the main robotic tractor frame 55 and in front of the transverse axle 72. These assemblies include the upper partial circular track 140, a lower rear partial-circular track 75, one hydraulic motor 68, two optical rotation encoders $\theta_{R1}$ 43 and $\theta_{S1}$ 53 or some such sensors, and several additional components. Mounted on the axle drive shaft 202 (FIG. 12) of the robotic tractor 50, sensors $\Delta S_{1\_LEFT}$ 52L and $\Delta S_{1\_RIGHT}$ 52R measure the rotation of the axle of the robotic tractor 50 in order to determine the distance traveled by the robotic tractor 50. The average of the sensors $\Delta S_{1\_LEFT}$ 52L and $\Delta S_{1\_RIGHT}$ 52R is $\Delta S_1$. Mounted on the steering axle 72 are two air motors 170 L, R, (FIG. 12) which provide power to the wheels 70 L, R of the robotic tractor as needed.

The steering axle assembly 60 (FIG. 3) has an attachment at the top via a track attachment assembly 73L and 73R near the extremities of a rear partial-circular track 75. The partial-circular track 75 is somewhat longer than a semi-circle to allow for turns of greater than 90 degrees. The attachment assemblies 73L and 73R are designed solidly, but they attach behind the steering axle assembly 60 so that the space directly above the steering axle assembly 60 and forward is empty. This allows above 180 degrees of rotation of the steering axle assembly 60 about the transverse axle central pivot 58 (FIG. 3) in response to the torque applied by the rear partial-circular track 75.

The bottom of the rear partial-circular track 75 is in the same plane with the top of the main robotic tractor frame 55. The front of the rear partial-circular track 75 contains a channel with a heavy roller chain 216. The two ends of the heavy roller chain 216 are attached at the extreme rear points of the rear partial-circular track 75 on each side. At the point where the heavy roller chain 216 passes over the main robotic tractor frame 55, the heavy roller chain 216 forms a loop forward around a heavy main sprocket 77, consisting of two coaxial sprockets. Below the heavy roller chain on the main sprocket 77 is a roller chain 69, which connects the main sprocket with the power output sprocket 76 from the hydraulic steering motor assembly 68, providing the torque for steering the robotic tractor.

In a separate channel of the rear partial-circular track 75, just below the channel for the roller chain 216, a flexible steering cable (inside track 75, not shown) resides. This steering cable is also attached at the rearmost part of the rear partial-circular track 75 on each side and is pulled tight by a short heavy spring on one of the attachment points. At a point slightly to the side of where this steering cable passes over the main robotic tractor frame 55, it forms a twisted loop around a flat-bottomed pulley on a shaft rotating around a vertical axis located directly above an optical encoder $\theta_S$ 53. As it turns, this shaft rotates the input shaft of this optical rotation encoder $\theta_S$ 53 mounted on the main robotic tractor frame 55. This optical rotation encoder $\theta_S$ 53 provides information to the processor 49 about the orientation of the transverse axle 72 and of the running wheels 70L and 70R of the robotic tractor with respect to the main robotic tractor frame/tongue 55.

Two raised bumps just to each side of the center point on the top of the rear partial-circular track 75 will assist the processor 49 in keeping track of the axle orientation. These raised bumps will activate switches 236 L, R on rollers as they pass underneath the rollers. When both switches 236 L, R are simultaneously activated, the processor 49 will set the orientation of the track 75 to zero degrees.

A forward partial-circular track 100 attaches near its endpoints to the hitching points 106 L, R on the forward trailer 40 and pivots with the forward trailer 40 during turns. A narrow channel on the back of the forward partial-circular track 100 contains a flexible steering cable (inside track 100, not shown). This steering cable is attached at the front most part of the forward partial-circular track 100 on each side and is pulled tight by a short heavy spring on one of the attachment points. At the center of the tongue, where this steering cable pass over the main robotic tractor frame 55, it forms a twisted loop around a flat-bottomed pulley on a shaft rotating around a vertical axis. As it turns, this shaft rotates the input shaft of an optical rotation encoder $\theta_{D1}$ 44 mounted on the robotic tractor tongue 55. The pulses from this optical rotation encoder $\theta_{D1}$ 44 are transferred via pulse counting circuits to the microprocessor or computer 49, providing information about the orientation of the forward trailer with respect to the centerline of the main robotic tractor fame 55.

Two raised bumps just to each side of the center point on the top of the forward partial-circular track 100 will assist the processor 49 in keeping track of the track 100 orientation. These raised bumps will activate switches 854 L, R on rollers as they pass underneath the rollers. When both switches 854 L, R are simultaneously activated, the processor 49 will set the orientation of the track 100 to zero degrees.

The forward partial-circular track 100 is attached to the forward trailer 40 at its extremities via some sort of hitching device that allows some amount of pivoting around horizontal axes while preventing vertical or horizontal movement at the point of hitching to provide support and pulling force. In this embodiment, we will use standard ball hitch type latches 106L and 106R to represent the hitch arrangements for the partial-circular track 100. The heavy central member of the robotic tractor frame 55 attaches to a larger hitching point using a similar, but larger, hitching device that will be represented by hitch latch 108 which will allow pivoting around a vertical axis and some pivoting around horizontal axes while preventing vertical or horizontal movement at the point of hitching. The forward trailer 40 (FIG. 1) must be modified to have hitching points compatible with the robotic tractor hitch latches, which in this embodiment we will represent with hitch balls mounted solidly directly to each side of a heavy central hitch ball. The side hitch balls must be mounted slightly higher than the central ball to line up with their respective ball hitch latches 106L and 106R. Note that the partial-circular track 100 is not solidly attached to the main robotic tractor frame, but travels across it, in contact with it, during turns.

FIG. 5 is a top view of the robotic tractor showing details of the upper partial-circular track 140, with FIG. 6 being a close up of the rear section of FIG. 5. The upper partial-circular track 140 attaches at its endpoints to the trailer mounting bar 66 and pivots with it during turns. This upper partial-circular track 140 is mounted sufficiently above the rear partial-circular track 75 to easily clear it during operation and to allow unobstructed operation of both rotational systems. A narrow channel on the front of the upper partial-circular track 140 contains a flexible steering cable (inside track 140, not shown). This steering cable (inside track 140, not shown) is attached at the rearmost part of the upper partial-circular track 140 on each side and is pulled tight by a short heavy spring on one of the attachment points (in channel, not shown). At of the point where this steering cable (inside track 140, not shown) passes over the main robotic tractor frame 55, it forms a twisted loop around a flat-bottomed pulley on a shaft rotating around a vertical axis located directly above the optical encoder $\theta_{R1}$ 81. As it turns this shaft rotates the input shaft of an optical rotation encoder $\theta_{R1}$ 81 mounted on the main robotic tractor frame 55. Pulse counting circuits process the pulses from this encoder $\theta_{R1}$ 81 and then pass the data on to the microprocessor or computer 49, providing information about the orientation of the rear trailer 80 with respect to the main robotic tractor frame 55.

Two raised bumps just to each side of the center point on the top of the upper partial-circular track 140 will assist the processor 49 in keeping track of the track 140 orientation. These raised bumps will activate switches 242 L, R on rollers as they pass underneath the rollers. When both switches 242 L, R are simultaneously activated, the processor 49 will set the orientation of the track to zero degrees.

In this embodiment of the invention, the two fifth wheel latches 67 L, R on the trailer mounting bar 66 provide the means to transfer the torque between the upper partial-circular track 140 and the rear trailer 80. Unless some means for transferring this torque was provided, the trailer mounting bar 66 would simply rotate around the kingpin of the rear trailer 80 and any measurement of the orientation of the upper partial-circular track 140 would not be representative of the orientation of the rear trailer 80.

Figure 7:
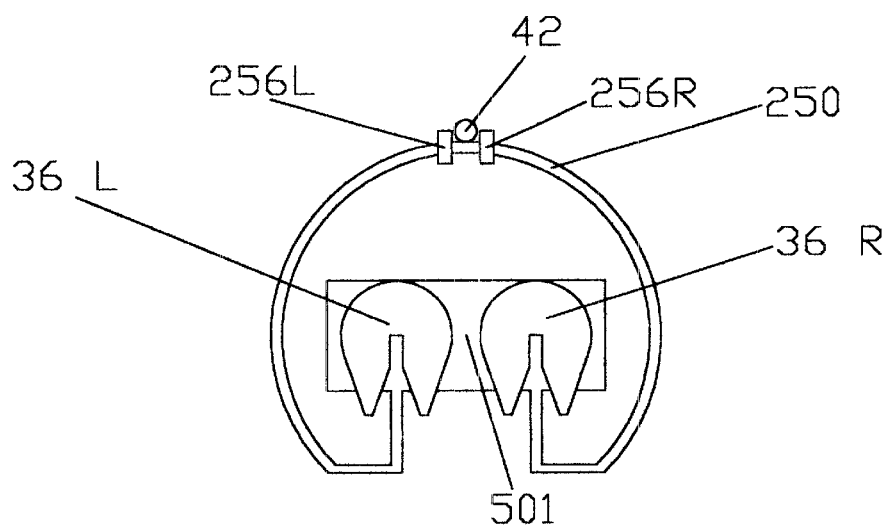
FIG. 7 is a diagrammatic view of a tractor partial circular track with associated sensors

FIG. 7 is a detail of the lead tractor partial-circular track 250 for measuring the orientation of the forward trailer with respect to the lead tractor. This diagram will apply for both the first and the second embodiments of the invention. The tractor partial-circular track 250 attaches near its endpoints to the forward trailer mounting bar 501 above the rear wheels of the tractor 30 and pivots with it during turns. A narrow channel on the front of the tractor partial-circular track 250 contains a flexible steering cable (inside track, not shown). This steering cable (inside track, not shown) is attached at the rearmost part of the tractor partial-circular track 250 on each side and is pulled tight by a short heavy spring on one of the attachment points. Near the point where this steering cable passes over the centerline of the tractor 30, it forms a twisted loop around a flat-bottomed pulley on a shaft rotating around a vertical axis. As it turns, this shaft rotates the input shaft of an optical rotation encoder $\theta_{R0}$ 42 mounted on the frame of the tractor 30. Pulse counting circuits then process the pulses from the encoder $\theta_{R0}$ 42 R, L, providing the microprocessor or computer 49 with information about the orientation of the forward trailer 40 with respect to the centerline of the tractor 30).

Two raised bumps just to each side of the center point on the top of the tractor partial-circular track 250 will assist the processor 49 in keeping track of the track orientation. These raised bumps will activate switches 256 L, R on rollers as they pass underneath the rollers. When both switches 256 L, R are simultaneously activated, the processor 49 will set the orientation of the track 250 to zero degrees.

In this embodiment of the invention, the two fifth wheel latches 36 L, R on the forward trailer mounting bar 501 provide the means to transfer the torque between the tractor partial-circular track 250 and the forward trailer 40 (FIG. 1). If no method for transferring this torque was provided, the forward trailer mounting bar 501 would simply rotate around the kingpin of the trailer 40 and any measurement of the orientation of the tractor partial-circular track 250 would not be representative of the orientation of the forward trailer 40 (FIG. 1). Alternatively, a stinger 500 (FIG. 13), or other device, could be used to prevent rotation around the trailer kingpin.

An optical rotation encoder $\Delta T$ 34 (on the tractor 30 itself, mounted in a manner that allow it to sense the rotation of the drive shaft of the tractor 30, provides information via pulse processing circuits to the microprocessor or computer 49 about movement and speed of the tractor 30. Note that this encoder must be mounted behind any two-speed axle gearbox(es) in order to give a true representation of the rotation of the tractor drive wheels.

PREFERRED SECOND EMBODIMENT OF INVENTION

Figure 8:
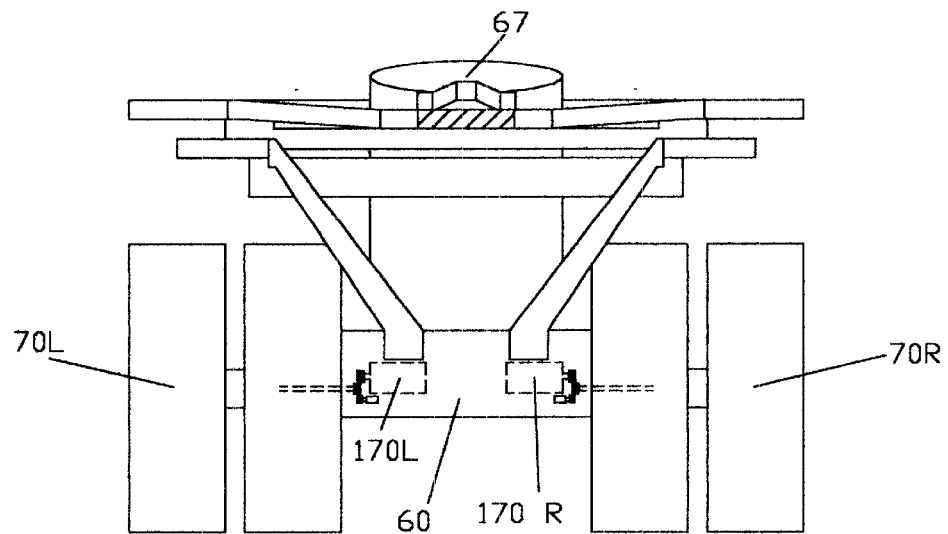
FIG. 8 is a diagrammatic back view of a second embodiment of the present invention
Figure 9:
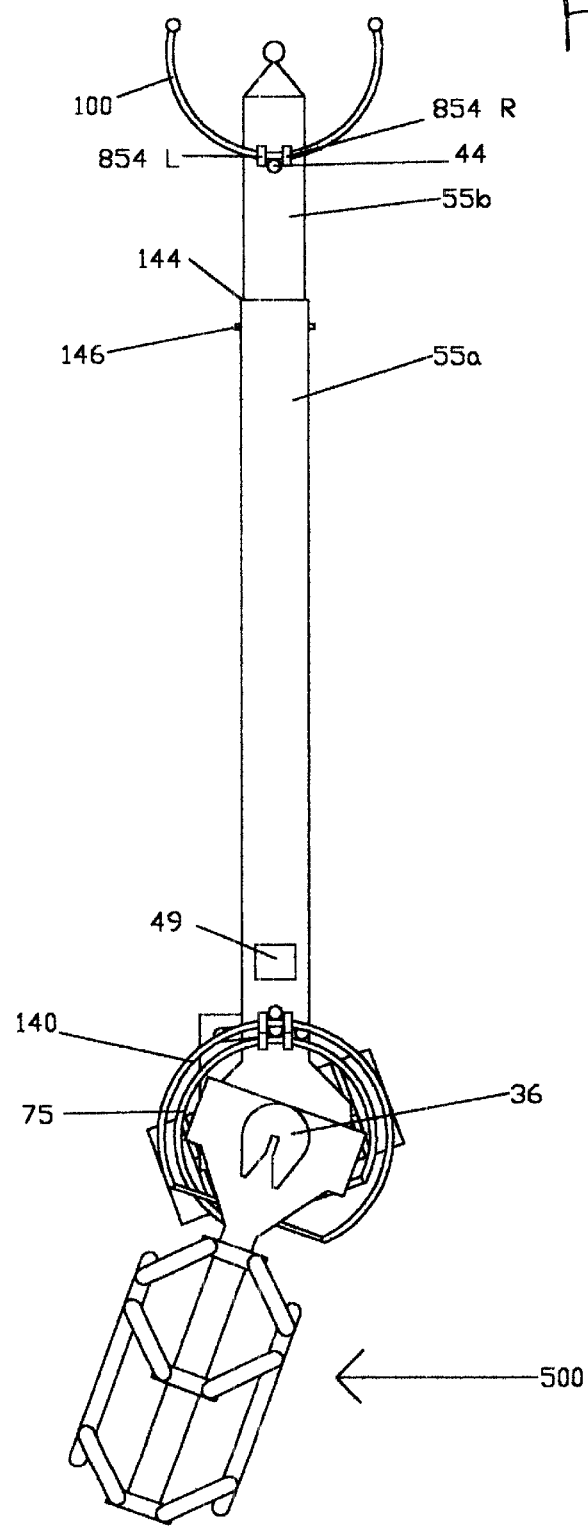
FIG. 9 is a diagrammatic top view of a second embodiment of the present invention

FIGS. 8 and 9 show a robotic tractor with path tracking steering, variable ratio with oversteer steering, and traction kinking that is a preferred embodiment of the invention. This embodiment differs from the simpler robotic tractor with path tracking of the first embodiment in several ways. The robotic tractor length can be adjusted in this embodiment. The robotic tractor tongue is split into two parts, 55a and 55b, and 55b can be extended or retracted at the joint 144, with the pin and lock set 146 holding it in place. This embodiment also uses traction kinking to assist in turning corners. This embodiment uses two separate path tracking modes, relative angle path tracking mode and rate of orientation change path tracking mode, instead of only the relative angle path tracking mode used in the first embodiment of the invention. Also, the variable ratio with oversteer steering mode is included in the combination of steering modes to allow the path-tracking modes to be combined with either a more stable version of the variable ratio with oversteer mode or a more maneuverable version of the variable ratio with oversteer mode. The traction kinking will be disabled when the robotic tractor is traveling in a straight line in order to conserve air pressure.

As described in the operations, the reference steering information for the relative angle path tracking mode comes mainly from sensor $\theta_{R0}$ 42 (FIG. 7) mounted on the tractor partial circular track 250 (FIG. 5) between the tractor 30 and the front trailer 40 (FIG. 1), and sensor $\Delta T$ mounted to sense the rotation of the tractor drive shaft. This information is compared to sensors $\theta_{R1}$, $\theta_{S1}$ and $\Delta S_1$. The details of the tractor partial circular track can be seen in FIG. 7.

The steering information for the variable ratio with oversteer robotic mode comes from $\theta_{D1}$, $\theta_{R1}$, $\theta_{S1}$, and $\Delta S_{1\_LEFT}$ 52L and $\Delta S_{1\_RIGHT}$ 52R.

The rate of orientation change path tracking mode will use sensor $\theta_F$ 31, the angle of the front tractor steered wheels, and sensors $\theta_{D1}$, $\theta_{R1}$, $\theta_{S1}$ and $\Delta S_1$.

Full redundancy is desirable for all the electronic components so that consequences of failures would be minimized, although this is optional to the invention, and not shown, for simplicity.

The rear partial-circular track 75 and the front partial circular track 100 are configured in the same way as in the first embodiment.

This complex embodiment includes a traction kinking system for assistance in cornering. The operation of this system is described in the operations.

The arrangement of the rear partial-circular track 75 and the front partial circular track 100, along with the associated sensors and switches is essentially identical to the arrangement of the equivalent structures of the first embodiment described above, and will not be repeated at this point.

To allow the main frame 55 to be manually adjusted, there is a joint 144. At this joint 144, a smaller main robotic tractor frame 55b section slides into a larger main robotic tractor frame 55a section and is secured by some type of mechanism such as a pin and lock set 146 to prevent slippage or movement during operation.

The arrangement of the upper partial-circular track 140, along with its sensors and switches is essentially identical to the arrangement of the equivalent structures of the simpler embodiment described above, however, in this embodiment of the invention, an articulated stinger assembly 500 is used instead of the second fifth wheel latch 67 L, R on the first embodiment of the invention. This stinger assembly 500 extends backward from the trailer mounting bar 66 to provide the means for transferring the torque between the upper partial-circular track 140 and the rear trailer 80. A detailed treatment of this stinger 500 will be presented in FIG. 13. The stinger 500 is used to prevent the rotation of the trailer mounting bar 66 around the kingpin of the trailer, in order to obtain an accurate measurement of the orientation of the rear trailer 80.

As mentioned above, optical rotation encoders $\Delta S_{1\_LEFT}$ 52L and $\Delta S_{1\_RIGHT}$ 52R (FIG. 12) will record the rotation of the drive shaft for each robotic tractor wheel 70 L, R. The software in the microprocessor or computer 49 will use this information in two ways. The average of the distance traveled by the left and right wheels 70 L, R will yield the distance traveled by the robotic tractor in any given time interval. The difference in the distance traveled by the left and right wheels 70 L, R will be scaled to yield a measure of the amount of cornering that the robotic tractor wheels 70 L, R are undergoing. This difference will be used with the ratio with oversteer mode. The details of this operation will be covered in the Operations section.

The primary microprocessor or computer 49 would be in control at any time with the secondary microprocessor or computer continually performing a check on the operation of the primary microprocessor or computer 49 and taking control of the operation if the situation warranted it. Any significant discrepancies could be reported to the driver as a warning. Since each microprocessor or computer 49 has access to all the sensors, errors can be detected and corrective actions taken.

Figure 11:
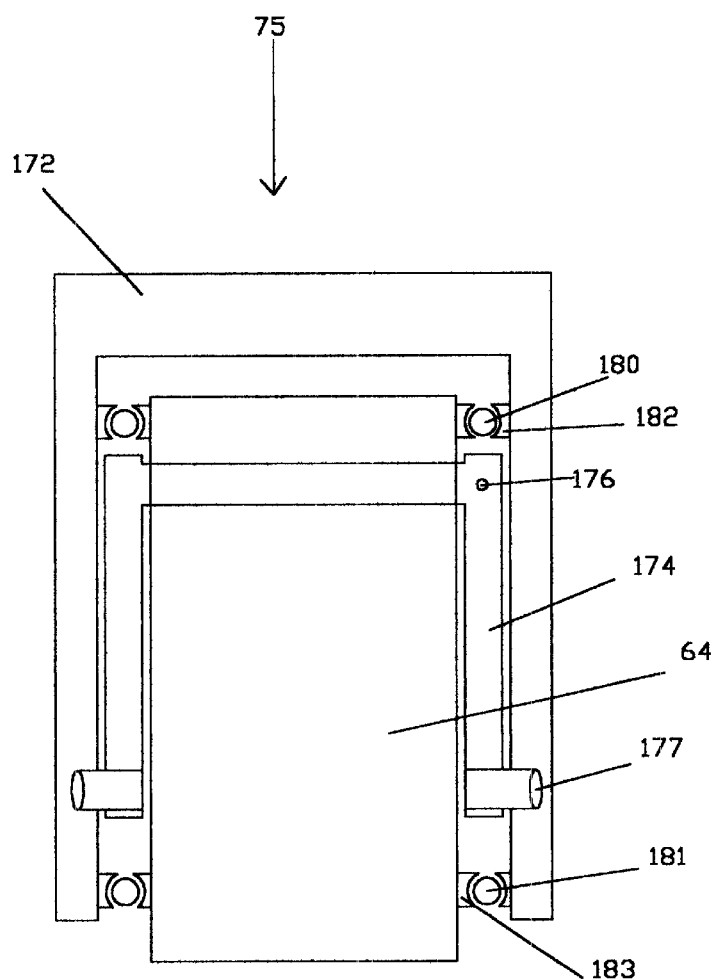
FIG. 11 is a diagrammatic end view detail of a transverse axle and axle hanger assembly

Below the main robotic tractor frame 74 a heavy axle hanger central pivot 58 supports and allows pivoting of the steering axle assembly 60 and of the transverse axle 72 with its associated components. Bearing plates provide stability for this pivot. The traction kinking motors can be seen inside the steering axle assembly FIG. 11 shows an end view of a detail of the transverse axle 72 inside the axle hanger assembly 75. Since the input to the kinking system is the sideways force on the robotic tractor axle 72, we must have some way of measuring this force. In this embodiment of the invention, the transverse axle 72, together with the air motors for the traction kinking system, is mounted in an axle hanger assembly 75 that allows some movement from side to side in response to a sideways force. This movement is used to activate air regulator switches 183, 184 (FIG. 12) (or some such device) on each side, which then power the kinking system.

The axle 72 is mounted in the center of an inverted U-shaped channel 172 in the axle hanger assembly 75. The weight on the axle 72 is supported by a number of vertical arms 174 each of which attach via a pivot 176 at the top to the axle 72 and via a pivot 177 at the bottom to the lower sides of the U-shaped channel 172. When a sideways force is applied to the axle 72, the vertical arms 174 swing somewhat to the side in response to the force. At the top and bottom of the channel 172, roller bearings 180, 181 in partial-circular races 182, 183 stabilize the axle 72 against forward and/or backward forces and against twisting movement.

Figure 12:
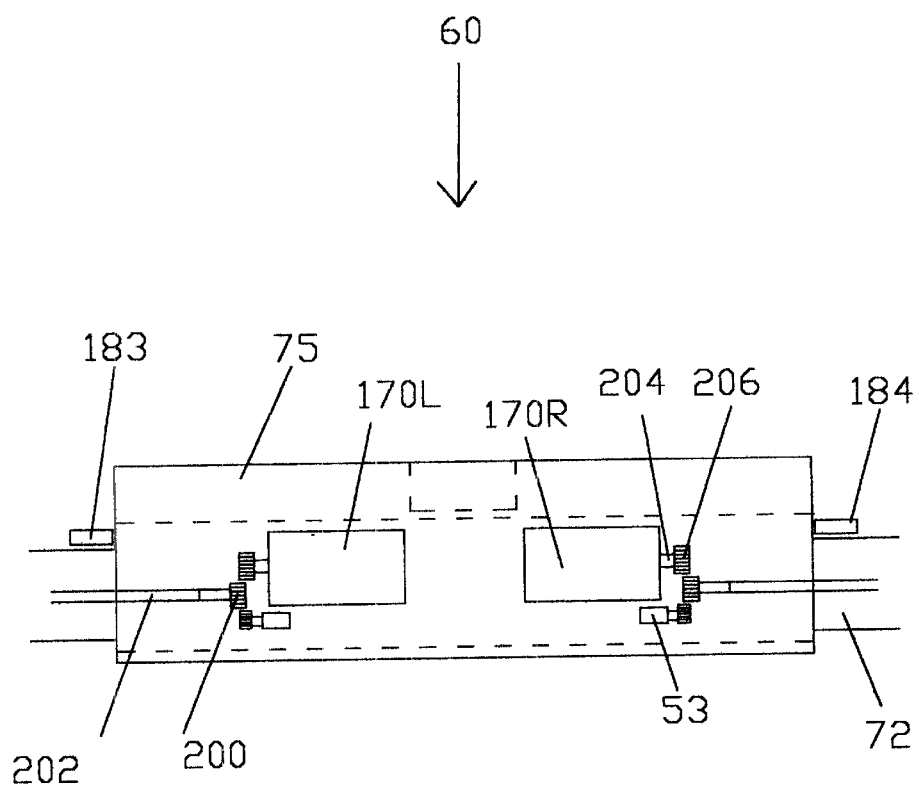
FIG. 12 is a diagrammatic back view detail of a transverse axle hanger assembly and traction kinking air motor assembly

FIG. 12 is a detail of the location of regulator switches or pressure transducers 183, 184 on the axle hanger assembly 75. The axle 72 is shown passing through the axle hanger assembly 75, which rotates on the vertical axle central pivot 58. The air motors for the traction kinking system, mounted on the axle 72, are also located inside the axle hanger assembly 75. The movement of the axle 72 in response to the sideways forces upon it activates a regulator valve or pressure transducer 183, 184 placed on each side of the axle 72. Full air pressure from the truck air system is applied to the input side of these switches 183, 184. The switches 183, 184 are designed to send increasing pressure to the traction kinking system as the sideways force increases, in just the opposite manner to the way the force on the brake pedal reduces the pressure to the brakes in an air brake system. During a turn, if the sideways pressure tries to push the robotic tractor to the inside of the turn, air pressure is sent to the air motors in the traction kinking air motor assembly 170 L, R (FIG. 6) to push the robotic tractor wheels 70 L, R (FIG. 8) forward, relieving the pressure. If the sideways pressure tries to push the robotic tractor to the outside of the turn, air pressure is sent to the brake activation system to slow the robotic tractor 72 and eliminate the risk of jackknifing.

The traction kinking air motor assemblies 170 R, L that comprise the power source for the traction kinking drive system are mounted below the transverse axle 72 on each side. Each air motor assembly 170 R, L includes gearing to slow the rotation to the appropriate speed and to increase the torque. The output from each air motor assembly 170 R, L is applied via a gear 200 on a drive shaft 202 that extends out through the center of each wheel 70 R, L. The wheels 70 R, L and the shafts are mounted on bearings in a similar manner to the drive wheels on the back of a truck tractor. No differential is needed, because the two air motors 170 R, L have a common air supply and will apply equal torques to the shafts 200 they are driving. Two optical rotation encoders, one on each drive axle 202 (FIG. 12), $\Delta_{S1\_Left}$, $\Delta_{S1\_Right}$ 53L, R record the rotation of the shafts 202 and transfers the information via pulse processing circuits to the microprocessor or computer 49.

FIG. 12 is a detail of the traction kinking air motor assembly 170 R located on the transverse axle inside the axle hanger assembly. The two similar air motor assemblies 170 L, R convert the air pressure sent by the regulator switches 183, 184 (FIG. 12) into torque to drive the robotic tractor wheels 70 L, R (FIG. 3). Each assembly 170 L, R includes a system of gears to reduce the speed and increase the torque of the air motors 171 L, R. When the air motor 171 R is activated, the shaft 204 R and gear 206 R carrying the output rotation from the air motor assembly 170 R engages a gear 200 R on the end of the axle shaft 202 R that extends out through the center of the wheels 70 R (FIG. 7) on the side of the robotic tractor. This shaft 202 R then causes the wheels 70 R (FIG. 7) to drive forward in a manner similar to the way the drive wheels of the truck tractor operate. Since the two air motor assemblies 170 L, R share a common air pressure source, no differential gears are needed to equalize the torques on the wheels 70 L, R.

Figure 13:
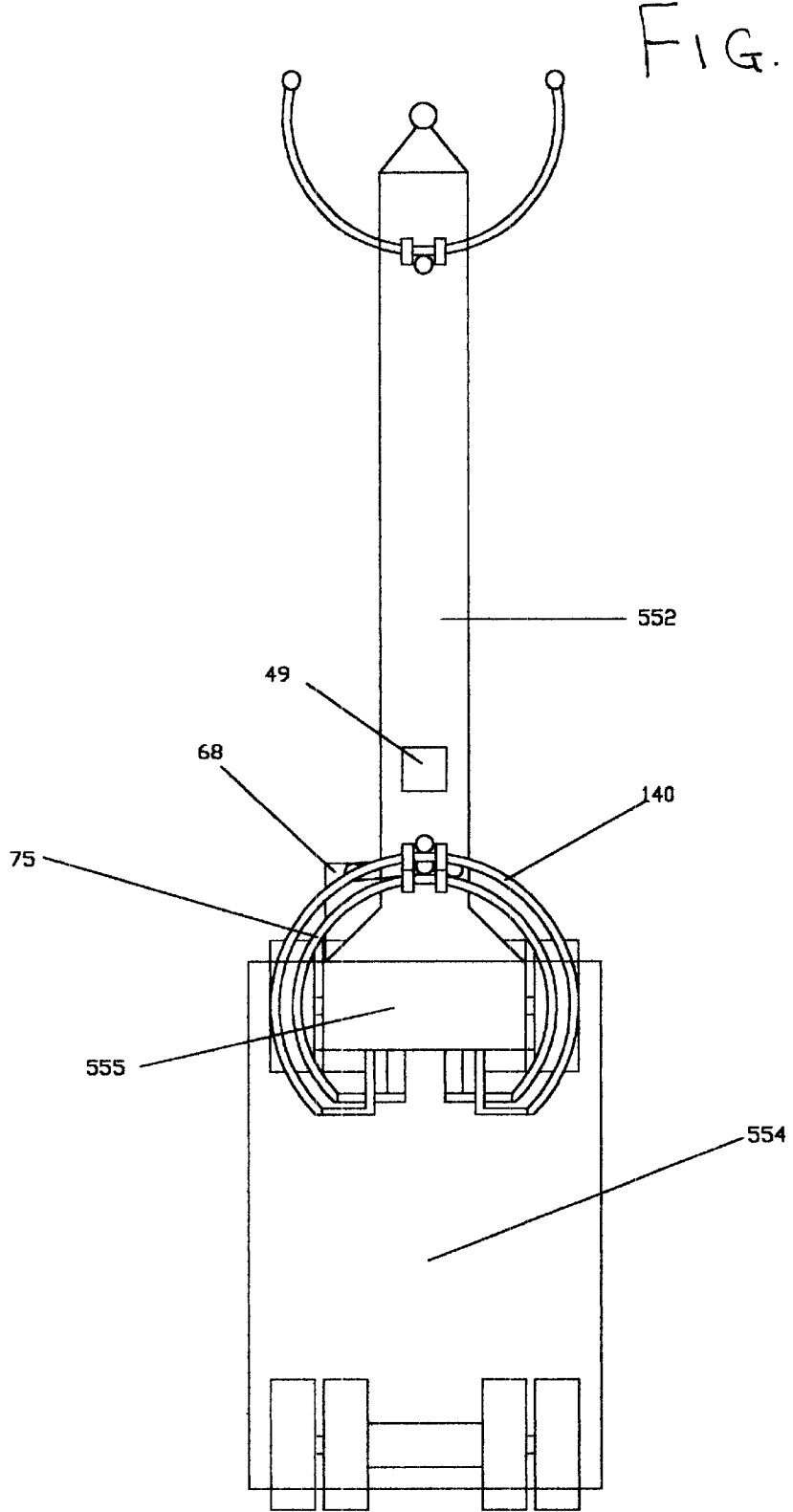
FIG. 13 is a diagrammatic view of a double-axle wagon according to one embodiment of the articulated machine of the present invention

FIG. 13 shows a detailed view of the articulated stinger assembly 500 that is attached to the back of the trailer mounting bar 66. The heavy central bar 546 of the stinger assembly is designed to withstand substantial sideways forces. The locking arms 544 slide freely forward and backward along the heavy central bar 546, but are prevented by a stop from sliding off the end. Each locking arm 544 consists of three actuating arms 541, 542, 543, the back two of which are parallel, and a contact bar 540 with a heavy solid rubber pad that remains parallel to the heavy central bar 546 during deployment. The entire stinger assembly 500 is mounted to the trailer mounting bar 66 via a spring-supported hinge 548 so that it can be easily positioned during hitching operations.

In this embodiment of the invention, this articulated stinger assembly 500 provides the means to prevent the rotation of the trailer mounting bar 66 around the kingpin of the rear trailer 80. The stinger locking arms 544 can be slid backward or forward into position between the trailer structural members or between the two legs of the trailer landing gear. The locking arms 544 can then be opened tightly outward against the structural members or the legs of the landing gear to lock the trailer mounting bar 66 rigidly into place with respect to the rear trailer 80. If the trailer has no solid structures on which to lock the stinger assembly, an adapter can be provided which will allow the stinger to lock to the sides of the trailer itself, with supporting straps going over the top of the trailer.

THIRD EMBODIMENT

FIG. 14 shows a double-axle trailer or wagon that utilizes path tracking and variable ratio with oversteer mode steering with traction kinking. This wagon is designed to be pulled in a "Multiple Wagon Train" configuration behind a three-quarter ton pickup or some such vehicle, so it will be accordingly sized down somewhat from the robotic tractor with path tracking steering, variable ratio with oversteer and traction kinking discussed as the complex embodiment above. As was true for the robotic tractor however, this wagon will require three hitch balls on the towing vehicle. The second wagon in the train will use as input the orientation information from the upper 140 and lower partial circular tracks 75 of the first wagon in the train. The steering system for this wagon is identical to that for the robotic tractor except that control and shifting by the driver and the controlling microprocessor or computer 49 will utilize 12 volt solenoids and/or 12 volt DC motors instead of the air motors used by the robotic tractor. Ratios used for the variable ratio with oversteermode of steering may also be somewhat different for the wagon than for the robotic tractor. The mounting of the partial circular tracks and the sensors will be similar to that for the robotic tractor, but since the back portion of the wagon 554 will be permanently attached to the wagon mounting bar 555 on the front section of the main wagon frame 552, there will be no need for the two fifth wheels or for the articulated stinger that were present on the robotic tractor.

The traction kinking system must also be modified to operate on 12 volt DC power, and an extra battery may be needed to supply the additional current. Again, the traction kinking system will be disabled when the steered wheels of the wagon are aligned with the centerline of the wagon tongue. The hydraulic steering motor 68 steering wheels will use an electric motor to drive the hydraulic pump.

FIG. 14 is a diagrammatic representation of a lead tractor and trailer making a turn. The angles, lengths, and distances demonstrated in this diagram will be used in the operations section to derive the mathematical equations relating to the rate of orientation change mode of steering.

Figure 15:
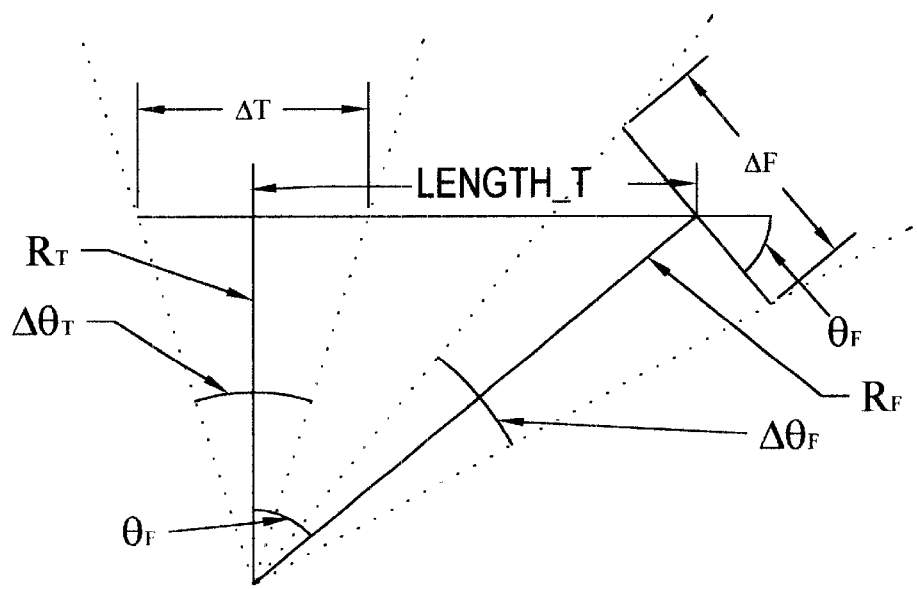
FIG. 15 is a diagrammatic representation of a robotic tractor and trailer making a turn

FIG. 15 is a diagrammatic representation of a robotic tractor and trailer making a turn. The angles, lengths, and distances demonstrated in this diagram will be used in the operations section to derive the mathematical equations relating to the rate of orientation change mode of steering.

Operations

The primary goal of this path tracking steering system is to have the pivot point at the front of the second semi-trailer follow the same path as the pivot point at the front of the first semi-trailer. In the preferred embodiment, two different path tracking modes and one non-path-tracking mode, variable ratio with oversteer mode, are combined in order to steer the robotic tractor. The modes will be combined based on the steering characteristics desired. In most cases, the modes will provide very similar steering output. But in some cases, for example, if the wheels of the vehicle slip sideways, the steering output can differ to a greater degree, depending on the degree of the slippage. The ability to combine a number of different path tracking modes, and even non-path tracking modes such as the non-path-tracking "variable ratio with oversteer" steering mode, will contribute significantly to the reliability of the final product, since errors in one mode are offset by the contributions of other modes.

Full redundancy for all electronic components would be desirable to minimize the consequences of failures, but since ease of understanding is a priority here, redundancy was not included in this embodiment.

A secondary controller is used to check on the operation of the primary controller 49 and could take control if the situation warranted it. Any significant discrepancies between the two controllers could be reported to the driver as a warning.

Output from the Controller to Steer the Robotic Tractor Axles

The robotic tractor is steered by rotating the steering axle assembly about its central pivot 58 (FIG. 3) by applying the steering correction needed for a particular travel interval. This steering correction is generated by the steering algorithms. Each steering algorithm independently generates a parameter that represents this steering correction needed for a particular travel interval. This parameter is named $\Delta$. Each steering algorithm generates a $\Delta$ of its own. For example, the rate of orientation mode generates a $\Delta \text{Path}_{1\_Rate\_of\_Orientation}$. This value $\Delta$ indicates the magnitude and direction of the steering angle change that the axle needs to undergo according to the particular steering mode or combination of modes generating the $\Delta$. A positive value of $\Delta$ would cause the wheels to be steered more to the right of the robotic tractor centerline, and a negative $\Delta$ would cause them to be steered more to the left of the robotic tractor centerline. A larger magnitude of $\Delta$ would cause more rapid steering movement.

In this embodiment, a reversible hydraulic motor 68 geared down to a moderate speed will provide the energy for turning the axle when the software detects that movement is required. This hydraulic motor 68 is provided with automatic braking mechanisms that lock the gear train into position at times when no action is required of the hydraulic motor 68. The hydraulic valves that are activated by the controller 49 to control the flow of the hydraulic fluid to this motor act as a secondary hydraulic braking system. Low air pressure or low hydraulic pressure will cause the motor to move the axle to a straightforward position and then activate the braking mechanisms. The hydraulic motor operates from a reservoir of fluid in a pressure chamber where the hydraulic fluid is separated from a compressed gas by a diaphragm. This hydraulic tank, located in the steering motor assembly, will provide a reservoir of energy for emergency positioning if all power is lost. The fluid in the chambers is continuously replenished during operation by an air motor or electric motor operating a high-pressure hydraulic pump in the steering motor assembly.

The Traction Kinking System

The traction kinking section is used to prevent sideways sliding of the robotic tractor wheels either when the pull on the tongue causes the robotic tractor to be pulled to the inside of the corner or when excessive forward forces cause the robotic tractor to be pushed to the outside of the corner. This system uses the forward or backward traction of the robotic tractor wheels to control the "kinking" behavior of the robotic tractor.

The traction kinking system functions in two modes. If excessive sideways force toward the inside of the curve is sensed, the system acts to accelerate the robotic tractor and rear trailer to prevent the robotic tractor wheels from slipping toward the inside of the turn. To do this, traction kinking system activates its air motors 170 L, R (FIG. 12), driving the robotic tractor wheels forward. The same air pressure is supplied to both of the air motors 170 L, R, assuring that the torque on the two sides is equal. The pressure of the air that is supplied will be increased as the amount of sideways pull that is being experienced by the axle increases.

If excessive force toward the outside of the curve is sensed, the traction kinking system applies the brakes to the second trailer and to all sections behind the second trailer, acting as a jackknife prevention device. The brakes on the robotic tractor itself will not be activated by the kinking braking system.

The primary input used by the controller to manage the traction kinking system is the sideways force on the robotic tractor axle 72 (FIG. 12). The design of the robotic tractor axle hanger assembly 75 (FIG. 12) allows the magnitude of this sideways force to be sensed directly by the regulator valves 183, 184 (FIG. 12). The regulator valves are directly activated by the sideways force and act as the control valves, sending air pressure to the traction kinking motors or activating the automatic braking system as appropriate.

The controlling microprocessor or computer 49 also keeps up with the orientation of the rear partial-circular track 512 and uses algorithms to determine the direction and/or the amount of torque needed for proper traction kinking of the robotic tractor and the back trailer. If the tractor-trailer combination rig is making a left turn, a pull to the left on the axle will indicate that the drive wheels of the robotic tractor should be speeded up, so air pressure will be applied to the traction kinking air motors 170 L, R (FIG. 12) to cause the robotic tractor to move forward faster. If the axle experiences a pull to the right during a left turn, it indicates that the trailer is moving too fast, trying to push the robotic tractor along. In this case, the brakes will be applied on both the robotic tractor and on the trailer it is supporting to slow the trailer back down and prevent the robotic tractor wheels from being pushed sideways. In a similar fashion, a pull to the left during a right turn will cause the brakes to be applied, while a pull to the right during a right turn will cause air pressure to be sent to the air motors powering the wheels.

When the robotic tractor wheels 70 R, L are close to alignment with the robotic tractor centerline, the application of forward traction will be ineffective. In this situation, the controller will reduce the amount of air pressure sent to the traction kinking motors to reduce wear and tear on the system. The traction kinking braking system need not be disabled in these situations, but could serve to activate the rear trailer braking system if the rear trailer started applying significant forward pressure to the forward trailer.

A pressurized air tank located on the robotic tractor will provide a reservoir of energy for the traction kinking system. This reservoir can store the substantial amounts of power that will be required by the air motors of the traction kinking system to accelerate the robotic tractor in tracking and cornering maneuvers. The air pressure in the tank is continuously replenished during operation by a direct supply from the tractor compressor, by a separate internal combustion engine located on the robotic tractor operating an air compressor, and/or by electric motors operating air compressors.

This traction kinking system is incorporated from Provisional Patent No. 60/179,745.

Figure 10:
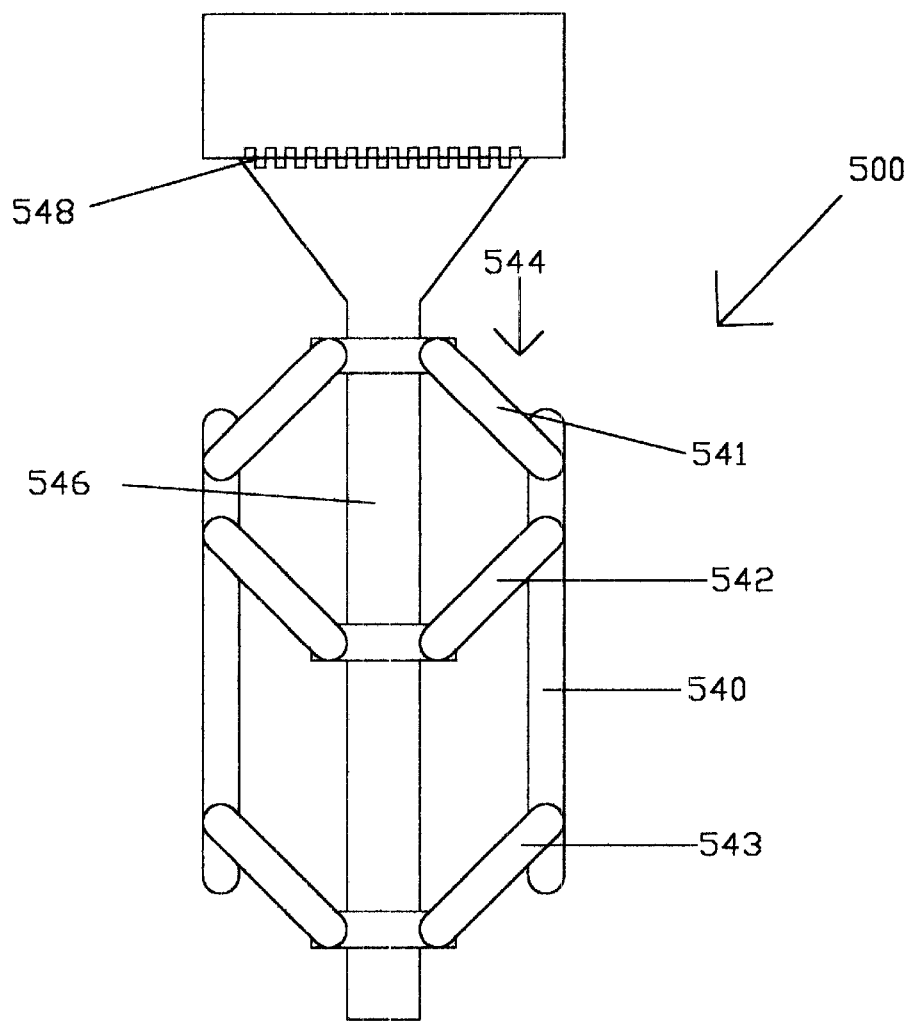
FIG. 10 is a diagrammatic top view detail of a stinger

Operation of the Articulated Stinger Assembly (FIG. 10)

In the more complex embodiment of the invention, the articulated stinger assembly 500 (FIG. 10) extending backward from the trailer mounting-bar 66 (FIG. 10) provides the means to prevent the rotation of the trailer mounting-bar 66 (FIG. 10) around the kingpin of the trailer. Without some mechanism for preventing this rotation around the trailer kingpin, the readings from the sensors for the orientation of the trailer-mounting bar with respect to the robotic tractor tongue would be meaningless. This stinger 500 (FIG. 10) has locking arms 544 (FIG. 10) that can be slid backward or forward into position between the trailer structural members or between the two legs of the trailer landing gear. The locking arms 544 (FIG. 10) are then opened tightly outward against the structural members or the legs of the landing gear to lock the trailer mounting-bar 66 (FIG. 10) rigidly into place with respect to the trailer. If the configuration of the trailer is such that no substantial structural members are available, an adapter (not shown) can be provided which will allow the stinger to latch onto the sides of the trailer, with a strap going over the top of the trailer to hold the adapter in place.

FIG. 10 shows a detailed view of the articulated stinger assembly 500 (FIG. 10) that is attached to the back of the trailer mounting bar 500 (FIG. 10). The heavy central bar 546 (FIG. 10) of the stinger assembly is designed to withstand substantial sideways forces. The locking arms 544 (FIG. 10) slide freely forward and backward along the heavy central bar 546, but are prevented by a stop from sliding off the end. Each locking arm 544 (FIG. 10) consists of three actuating arms 541, 542, 543 (FIG. 10), the back two of which are parallel, and a contact bar 540 (FIG. 10) with a heavy solid rubber pad that remains parallel to the heavy central bar 546 (FIG. 10) during deployment. The entire assembly is mounted to the trailer mounting-bar 66 (FIG. 10) via a spring-supported hinge 548 (FIG. 10) so that it can be easily positioned during hitching operations.

Two raised bumps just to each side of the center point on the top of each of the three partial-circular tracks mentioned above will assist the processors in keeping track of the orientation of the tracks. These raised bumps will activate switches on rollers as they pass underneath the rollers. When both switches for a given track are simultaneously activated, the processor will set the orientation to zero degrees for that track.

Physical Basis and Details of Algorithms for Path Tracking Modes, Variable Ratio with Oversteer Mode, and Combinations of Steering Modes At this point we will attempt to describe the physical basis and the details of the algorithms that will control the steering behavior of the robotic tractor.

The data from each of the input sensors to the steering system can be transferred to the controller 49 at either fixed time intervals or fixed travel intervals. For the purposes of the algorithms used here, the data from both the lead tractor 30 and the robotic tractor is obtained on the basis of fixed travel intervals.

The data could be acquired at time intervals, then converted by the controller 49 using interpolation between data points to plot, or reference, each piece of data acquired to a pseudo-travel interval of either the lead tractor 30 drive wheels or of the steered wheels of the robotic tractor as required. Thus, each piece of data would be converted from a time basis to either a lead tractor 30 travel interval basis or a robotic tractor travel interval basis, but this system is not used in this invention.

For each travel interval, the controller 49 will acquire data from each sensor on the lead tractor 30 and/or the robotic tractor. The data from the angle sensors will be scaled to radians of rotation of the angle being measured, and the distance sensors will be scaled to feet traveled by the wheels being measured.

Calculations based on data from the lead tractor 30 will use the data that has been placed on a lead tractor 30 travel interval basis, and calculations based on data from the robotic tractor will use the data that has been placed on a robotic tractor travel interval basis. The separate reference for the linear movement of the lead tractor 30 and of the robotic tractor 50 is not a requirement of this invention, but is only used to obtain a higher degree of control.

Now the controller 49 has a set of data from each sensor, stored either on a basis of lead tractor 30 travel intervals or on a basis of robotic tractor 50 travel intervals depending on where the data originated. These numbers represent the movement of a particular encoder or the reading of a particular sensor during that travel interval. The remainder of the processing will take the form of mathematical manipulation of these numbers. The sensors used are listed here.

The angle $\theta_{R0}$, between the lead tractor and the lead tractor's trailer will be positive when the lead tractor is rotated clockwise of the straight-ahead position with respect to the trailer carried by the lead tractor and negative when the lead trailer is rotated counterclockwise of the straight-ahead position. Sensor $\theta_{R0}$ 44 will be on a lead tractor travel interval basis.

The angle $\theta_F$, which derives the angle between the lead tractor and the lead tractor steering axle from how sharply the steering wheel of the lead tractor is turned, will be positive when the steering axle is clockwise of the straight-ahead position with respect to the lead tractor and negative the steering axle is counterclockwise of the straight-ahead position. Sensor $\theta_F$ 44 will be on a lead tractor travel interval basis.

The angle $\theta_{D1}$ 44, between the robotic tractor and the trailer in front of it, will be positive when the trailer is rotated clockwise of the straight-ahead position with respect to the tongue of the robotic tractor and negative when the trailer is rotated counterclockwise of the straight-ahead position. Sensor $\theta_{D1}$ 44 will be on a robotic tractor travel interval basis.

The angle $\theta_{R1}$ 81, between the tongue of the robotic tractor and the trailer towed by the robotic tractor, will be positive when the robotic tractor tongue is rotated clockwise of the straight-ahead position with respect to the trailer carried by the robotic tractor and negative when the robotic tractor axle assembly is rotated counterclockwise of the straight-ahead position. Sensor $\theta_{R1}$ 44 will be on a robotic tractor travel interval basis.

The angle $\theta_{S1}$ 53, between the robotic tractor tongue and the robotic tractor steering axle, will be positive when the steering axle assembly is rotated clockwise of the straight-ahead position with respect to the tongue and negative when the steering axle assembly is rotated counterclockwise of the straight-ahead position. Comparable sign conventions will be used for the lead tractor sensors. Sensor $\theta_{S1}$ 44 will be on a robotic tractor travel interval basis.

The distance sensor $\Delta S_{1\_LEFT}$ measures the distance the left wheel of the robotic tractor travels. It is obtained from the rotation of the left axle shaft of the robotic tractor.

The distance sensor $\Delta S_{1\_RIGHT}$ measures the distance the right wheel of the robotic tractor travels. It is obtained from the rotation of the right axle shaft of the robotic tractor.

The distance sensor $\Delta S_{S1}$, measures the distance the robotic tractor travels, and is the source of the robotic tractor travel intervals. It is the average of $\Delta S_{1\_LEFT}$ and $\Delta S_{1\_RIGHT}$.

The distance sensor $\Delta_T$, measures the distance the robotic tractor travels, and is the source of the lead tractor travel intervals. It is obtained from the rotation of the drive shaft of the lead tractor.

At the completion of each travel interval, the processor will also use the distance traveled during the interval by the robotic tractor, $\Delta S_1$ to complete the following calculation:

$$SPD=[AV*SPD*DIFF_{Time}+\Delta S_1]/[(AV+1)DIFF_{Time}]$$

Where SPD is the average running speed, $\Delta S_1$ is the distance traveled during the latest interval by the robotic tractor, and $DIFF_{Time}$ is the number of seconds of time since the last travel interrupt. The number AV is representative of the number of intervals over which the average speed is calculated. A larger AV will produce a SPD that varies more slowly with momentary velocity changes.

When the robotic tractor 50 is operating in the relative angle path tracking mode or the rate of orientation change path tracking mode, the value of each piece of data obtained from the lead tractor 30 sensors will be stored in memory in a manner that references each value to the linear position of the lead tractor 30 drive wheels at the time the value was acquired. These numbers will be recalled from memory after the robotic tractor 50 wheels have traveled a distance equal to the linear separation of the robotic tractor 50 wheels and the lead tractor 30 drive wheels.

Relative Angle Mode

In general, the relative angle mode detects the angle between the lead tractor and the first trailer at the fifth wheel, delays this angle, and causes the angle between the robotic tractor steering axle and the second trailer at the fifth wheel to match what the angle between the lead tractor and the first trailer was when they passed that point.

As shown FIGS. 2, 3, 4, 5, and 6, relative angle mode steering utilizes three angle sensors and two distance measures. The angle sensors are $\theta_{R1}$ 81, $\theta_{S1}$ 53, and $\theta_{R0}$ 42. The linear motion sensors are sensor $\Delta T$ 34 and sensor $\Delta S_1$. The $\Delta T$'s and $\Delta S_1$'s are each summed in $DIST_T$ and $DIST_{S1}$, respectively. The combined length of the first trailer 40 and the robotic tractor tongue 55 are input into the controller 49 before starting, and the difference between $DIST_T$ and $DIST_{S1}$ is initialized to be equal to this combined length. The angle $\theta_{R0}$ is saved with an associated reading from $DIST_T$. When the value of $DIST_{S1}$ reaches the value that $DIST_T$ had when the angle $\theta_{R0}$ was stored, the controller will compare the value of the angle $\theta_{S1}+\theta_{R1}$, between the steering axle assembly and the trailer being towed by the robotic tractor, to the stored value of the angle $\theta_{RO}$ in order to determine how much steering correction is needed. Then the hydraulic steering motor 68 will adjust the angle $\theta_{S1}+\theta_{R1}$ in order to make it equal to the value that angle $\theta_{RO}$ had when the lead tractor passed that point.

The difference between $\theta_{RO}$ and $\theta_{S1}+\theta_{R1}$ becomes a parameter $\Delta \text{PATH}_{1\_Relative\_Angle}$ that will be used to correct the robotic tractor steering axle orientation to match the orientation of the lead tractor 30 drive axle(s) when they passed the same point. The controller 49 will determine the steering necessary at each robotic tractor travel interval due to this steering mode by the following calculation:

$$\Delta \text{PATH}_{1\_Relative\_Angle} = \theta_{R0\_Delayed} - (\theta_{S1}+\theta_{R1})$$

For subsequent robotic tractors, the steering correction will be calculated in a very similar manner. The same equation is used. The sensors on the robotic tractor being considered are used in the equation, and the data from the lead tractor sensors is delayed an amount equivalent to the distance between the lead tractor and the robotic tractor being considered before it is used.

Rate of Orientation Change Mode

The second method of path tracking, rate of orientation change mode, measures the rate of orientation change with respect to distance traveled by the lead tractor in a horizontal plane. This information is delayed and compared to the rate of orientation change with respect to distance traveled by the robotic tractor and used for steering.

This method, as shown in FIGS. 14 and 15, utilizes the fact that the derivative with respect to distance traveled of the absolute orientation of the steering axle assembly of the robotic tractor must be equal to the derivative with respect to distance traveled of the absolute orientation of the lead tractor at the same linear position if the robotic tractor is following the path of the lead tractor. Even when we do not know the actual value of the absolute orientation of the lead tractor, this derivative can be extrapolated from the data obtained by sensor $\theta_F$ 31 that detects the angle between the tractor centerline and the direction of travel of the front wheels of the lead tractor.

In rate of orientation change path-tracking mode the controller 49 calculates the change in the angle of the lead tractor 30 axle in the horizontal plane during each lead tractor travel interval. This reference information is then stored and delayed an amount equal to the number of travel intervals between the lead tractor 30 drive wheel assembly and the robotic tractor steering axle assembly 60. The controller 49 also calculates the change in the angle of the robotic tractor axle in the horizontal plane during each robotic tractor travel interval. Then the controller 49 steers the robotic tractor to cause the rate of orientation change of the steering wheels of the robotic tractor to equal the rate of orientation change of the drive wheels of the lead tractor.

The equations for this mode can be derived using Ackerman geometry. In FIG. 14, the following variables are measured: $\Delta T$, the distance traveled by the lead tractor in one travel interval and $\theta_F$, the angle of the front steered wheels of the lead tractor 30 with respect to the centerline of the lead tractor 30. The LENGTH$_T$, the distance from the center of the front steering axle of the lead tractor 30 to the center of the rear drive axle (or equivalent average drive axle if the lead tractor 30 has more than one drive axle), is known. Using the fact that we know the two measured variables and the length, we can obtain $(\Delta \theta_T)/\Delta T$, which is the rate of orientation change of the entire tractor with respect to distance traveled by the drive wheels of the lead tractor. The following is the derivation for $(\Delta \theta_T)/\Delta T$:

$$\cos\theta_F = \frac{R_T}{R_F} \qquad 1.$$

$$R_T = R_F \cos\theta_F$$

$$\Delta\theta_T R_F = \Delta F$$

$$R_F = \frac{\Delta F}{\Delta\theta_T}$$

$$\Delta\theta_T R_T = \Delta T = \Delta\theta R_F \cos\theta_F$$

$$\Delta F = \frac{\Delta T}{\cos\theta_F}$$

$$\sin\theta_F = \frac{LENGTH_T}{R_F}$$

$$R_F = \frac{LENGTH_T}{\sin\theta_F} = \frac{\Delta F}{\Delta\theta_T}$$

$$\Delta\theta_T = \frac{\Delta F \sin\theta_F}{LENGTH_T} = \frac{\Delta T \tan\theta_F}{LENGTH_T}$$

$$R_T = R_F \cos\theta_F = \frac{LENGTH_T}{\tan\theta_F}$$

$$\frac{\Delta\theta_T}{\Delta T} = \frac{\tan\theta_F}{LENGTH_T}$$

From Ackerman steering definition:

$$\Delta\theta_T = \Delta\theta_F \qquad 2.$$

$$R_T = R_F \cos\theta_F \qquad 3.$$

$$\Delta\theta_T R_F = \Delta F \qquad 4.$$

And the same equation for the back of the tractor 30, and substituting for $R_T$ from equation 3, is:

$$\Delta\theta_T R_T = \Delta T = \Delta\theta R_F \cos\theta_F \qquad 6.$$

Rearranging and substituting for $\Delta\theta_T R_F$ from equation 5:
From FIG. 14:
Substituting from equation 5:
Substituting for $\Delta F$ from equation 7:
Dividing both sides of equation 10 by $\Delta_T$:
Therefore, if the travel intervals are small, the change in the angle of the lead tractor 30 drive axle is given by the equation:

$$\frac{\Delta\theta_T}{\Delta T} = \frac{[\tan(\theta_F)]}{LENGTH_T} \qquad 13.$$

Since this calculation is performed for each travel interval, the linear distance $\Delta T$ will be equal to the length of the lead tractor 30 travel interval.

The equivalent derivation using Ackerman geometry for the robotic tractor is shown in FIG. 22. The following variables are measured: $\Delta S_1$, the distance traveled by the steering axle of the robotic tractor; $\theta_{D1}$, the angle between the centerline of the forward trailer and the centerline of the robotic tractor tongue; $\theta_{S1}$, the angle between the centerline of the robotic tractor tongue and the centerline of the robotic tractor steering axle assembly 60; and LENGTH$_{D1}$, the length of the robotic tractor tongue from the hitch point of the first robotic tractor 50 to the center of the steering axle assembly as measured along the centerline of the robotic tractor 50. Using the four known variable values, you can obtain $(\Delta \theta_{S1})/\Delta S_1$ which is the rate of orientation change of the robotic tractor with respect to distance traveled by the robotic tractor steering axle assembly. The following is the derivation for $(\Delta \theta_{S1})/\Delta S_1$:

$$m + \frac{\pi}{2} - \theta_{DI} + \frac{\pi}{2} + \theta_{SI} = \pi \qquad 14.$$

$$m - \theta_{D1} + \theta_{S1} = 0 \qquad 15.$$

$$m = \theta_{D1} - \theta_{S1} \qquad 16.$$

Using the law of sines and substituting from equation 16:

$$\frac{LENGTH_{DI}}{\sin m} = \frac{LENGTH_{DI}}{\sin(\theta_{DI} - \theta_{DI})} = \frac{R_R}{\sin(\frac{\pi}{2} + \theta_{SI})} \qquad 17.$$

$$R'_R = \left( \frac{LENGTH_{DI} * \sin\left(\frac{\pi}{2} + \theta_{SI}\right)}{\sin(\theta_{DI} - \theta_{SI})} \right) \qquad 18.$$

$$R'_D = \frac{LENGTH_{DI} * \sin\left(\frac{\pi}{2} - \theta_{DI}\right)}{\sin(\theta_{DI} - \theta_{SI})}$$

$$\Delta\theta_{SI} = \Delta\theta_{DI} = \frac{\Delta S_1}{R'_D} = \Delta S_1 * \left[ \frac{\sin(\theta_{DI} - \theta_{SI})}{[LENGTH_{DI}] * \sin\left(\frac{\pi}{2} - \theta_{DI}\right)} \right]$$

$$\Delta\theta_{SI} = \frac{\Delta S_1}{LENGTH_{DI}} * \left[ \frac{\sin(\theta_{DI} - \theta_{SI})}{\cos\theta_{DI}} \right]$$

Using the same proess to determine $R_D$:

Using Ackerman geometry:

Using the trigonometric identity and substituting:

If the travel intervals are small between samples, the equation for the change in the angle of the robotic tractor 50 steering axle assembly 60 is:

$$\frac{\Delta\theta_{SI}}{\Delta S_1} = \frac{\lfloor\sin(\theta_{DI} - \theta_{SI})\rfloor}{(LENGTH_{DI}) * \cos(\theta_{DI})} \qquad 22.$$

where $\Delta S_1$ is the linear distance traveled by the wheels of the first robotic tractor 50, $LENGTH_{D1}$ is the length between the first robotic tractor 50 hitch point and the center of the steering axle assembly as measured along the robotic tractor 50 centerline, $\theta_{D1}$ is the angle between the centerline of the first trailer and the centerline of the first robotic tractor 50, and $\theta_{S1}$ is the angle between the perpendicular to the first robotic tractor 50 steering axles and the centerline of the robotic tractor 50. Again, since the data is referenced to each robotic tractor 50 travel interval, the value of $\Delta S_1$ will be equal to the robotic tractor 50 travel interval. Now, since the value of $\theta_S$ is under the direct control of the controller 49, it can be directly adjusted until the value of $\Delta \theta_{S1}$ matches the value $\Delta \theta_T$ had at that point in its linear travel.

Let $\theta_{F,DEL}$=the delayed $\theta_F$ \qquad 23.

then $$\Delta\theta_{T,DEL} = \Delta\theta_{S1} \qquad 24.$$

(to make dolly steering axle track drive wheels of tractor)

$$\frac{\Delta T * \tan\theta_{F,DEL}}{LENGTH_T} = \frac{\Delta S_1}{LENGTH_{DI}} * \left[ \frac{\sin(\theta_{DI} - \theta_{SI})}{\cos\theta_{DI}} \right] \qquad 25.$$

$$\frac{\Delta R}{R'_R} = \frac{\Delta S_1}{R'_D} \qquad 26.$$

$$\Delta R = \qquad 27.$$

$$\Delta S_1 * \left(\frac{R'_R}{R'_D}\right) = \Delta S_1 * \left[ \frac{LENGTH_{DI} * \sin\left(\frac{\pi}{2} + \theta_{SI}\right)}{LENGTH_{DI} * \sin\left(\frac{\pi}{2} - \theta_{DI}\right)} \right] = \Delta S * \left( \frac{\cos(-\theta_{SI})}{\cos\theta_{DI}} \right)$$

$$\sin(\theta_{DI} - \theta_{SI}) = \left(\frac{LENGTH_{DI}}{LENGTH_T}\right) * \left(\frac{\Delta T}{\Delta S_1}\right) * \tan\theta_{F,DEL} * \cos\theta_{DI} \qquad 28.$$

The delta needed to steer the dolly $\Delta_{Rate\_of\_Orientation}$ is then $$\theta_{S1\_calculated} - \theta_{S1\_measured} = \Delta_{Rate\_of\_Orientation} \qquad 30.$$

$$\Delta_{Rate\_of\_Orientation} = \qquad 31.$$

After having determined the rate of orientation change with respect to distance traveled for both the lead tractor (FIG. 21) and robotic tractor (FIG. 22), the controller 49 will determine the steering correction provided by this rate of orientation change mode necessary at each first robotic tractor 50 travel interval by the following calculation:

$$\Delta PATH_{Rate\_of\_Orientation} =$$

$$\theta_{DI} - \theta_{SI} - \arcsin\left[\left(\frac{LENGTH_{DI}}{LENGTH_T}\right) * (\tan\theta_{F\_Delayed}) * (\cos\theta_{DI})\right]$$

$\theta_{F\_DELAYED}$ is the angle between the front steered wheels of the lead tractor 30 and the lead tractor 30 centerline [delayed an amount equal to the linear distance between the lead tractor 30 drive wheels and the robotic tractor 50 wheels (empirically corrected with a response time correction, if needed)], and where $\theta_{S1}$ and $\theta_{D1}$ are defined as above. For subsequent robotic tractors, the steering correction will be calculated in a very similar manner. The same equation is used. The sensors on the robotic tractor being considered are used in the equations, and the data from the lead tractor sensors is delayed an amount equivalent to the distance between the lead tractor and the robotic tractor being considered before it is used.

Variable Ratio with Oversteer Mode

The variable ratio (with oversteer) mode of steering is an non-path-tracking mode that has been derived in a way that allows it to be used in combinations with the path tracking modes. This steering method is disclosed in U.S. patent application Ser. No. 09/721,214. This method does not rely on any information from the tractor 30 sensors, but only on sensors on the robotic tractor 50 itself. This method compliments the path tracking modes, each compensating for possible weaknesses in the other. This alternate steering mode can be used to factor into one or more of the path tracking modes. The variable ratio steering algorithm reacts more strongly the farther out of line the wheels slip, thereby automatically correcting the path back to the approximate path of the first trailer. The variable ratio (with oversteer) mode uses sensors $\theta_{S1}$, $\theta_{D1}$, $\Delta S_{1\_LEFT}$ and $\Delta S_{1\_RIGHT}$ and $\theta_{R1}$.

The difference between the counts for the two wheels will be scaled to yield a measure of the amount of cornering that the robotic tractor wheels are undergoing. This difference is accumulated and then decayed at a prescribed rate per linear foot of travel, and is used along with the input from sensor $\theta_{R1}$ as input to the oversteer logic system. The controller 49 will maintain two decayed running totals of the difference between the travel of the left wheel and the travel of the right wheel.

$$DIFF_{L\_R}=DIFF_{L\_R}+(\Delta S_{1\_LEFT}-\Delta S_{1\_RIGHT})-DECREMENT$$

And $$DIFF_{R\_L}=DIFF_{R\_L}+(\Delta S_{1\_RIGHT}-\Delta S_{1\_LEFT})-DECREMENT$$

Where $DIFF_{L\_R}$ is the decayed running total of the difference between the travel of the left wheel 71 L minus the travel of the right wheel 71 R, and $DIFF_{R\_L}$ is the decayed running total of the difference between the travel of the right wheel 71 R minus the travel of the left wheel 71 L. Also, $\Delta S_{1\_LEFT}$ is the travel of the left wheel 71 L in the latest travel interval and $\Delta S_{1\_RIGHT}$ is the travel of the right wheel 71 R in the latest travel interval. The number DECREMENT represents the amount of decay in each travel interval and can be adjusted as needed to change the oversteer characteristics of the system. Generally any accumulation in the delayed running totals $DIFF_{L\_R}$ and $DIFF_{L\_R}$ should decay within less than 100 feet or so to zero. At the end of any travel interval in which $DIFF_{L\_R}$ is less than zero, we will set $DIFF_{L\_R}=0$. At the end of any travel interval in which $DIFF_{L\_R}$ is less than zero, we will set $DIFF_{LR}=0$.

The steering ratio for the variable ratio mode could be varied as a function of turning angle, speed, or any other such variable, but for simplicity, we will demonstrate how the steering ratio would be varied continuously by the processors as the speed of the robotic tractor changes. At higher speeds, the controller 49 will automatically control the robotic tractor in a manner that is more stable (a more positive steering ratio), and at lower speeds, the processors will automatically control the robotic tractor in a manner that has better cornering ability (a more negative steering ratio). In order to accomplish this we will choose a correction factor, CORR, which is dependent upon the average speed of the robotic tractor. A steering ratio of −4 produces very responsive steering and a steering ratio of about +0.6 (depending upon the ratio of the robotic tractor length to the length of the robotic tractor and the rear trailer 80 together) produces very stable steering. If we wanted to vary the correction factor CORR linearly between −4 and +0.6 as the speed increased from 8 ft/sec to 30 ft/sec, we would use the equation:

$$CORR=(0.2091*SPD)-5.673$$

whenever $$8<SPD<30 \text{ ft/sec.}$$

If SPD was less than 8, then we would set:

$$CORR=-4$$

for $$SPD<8 \text{ ft/sec.}$$

And if SPD was greater than 30, we would set:

$$CORR=0.6$$

for $$SPD>30 \text{ ft/sec.}$$

CORR could also be a constant, or varied according to any method desired.

$\Delta RATIO_1$ is the steering output from the variable ratio (with oversteer) mode, the processor will then determine the steering output at each robotic tractor travel interval by the following calculation:

$$\Delta RATIO_1=[\theta_{D1}+(FAC_1)(\theta_{R1})+(FAC_2)(DIFF_{L\_R}-DIFF_{R\_L})]\\*(CORR)-\theta_{S1}$$

where $FAC_1$ and $FAC_2$ are the oversteer factors for the trailer orientation system and the accumulated robotic tractor wheel delayed difference system respectively, and $\Delta RATIO_1$ is the amount of movement determined by the variable ratio component of the steering algorithms to be needed by the axle steering system.

Methods for Combining Modes, and Advantages of Such Combinations

For the preferred embodiment of the invention, a non-path-tracking steering mode, the variable ratio (with oversteer) mode will be combined with the path tracking modes. This combination will help to assure that any errors that enter into the steering operation are not propagated in a way that will cause instabilities or offsets.

The variable ratio (with oversteer) mode is actually a non-path tracking mode of steering that can be combined with the path tracking modes of steering. In this capacity it will help to ensure that any errors that enter the system through wheel slippage, inaccuracies in measurements, or anything else are quickly and smoothly eliminated before problems develop. The variable ratio type of steering is particularly useful for eliminating any offset between the centerlines of the lead tractor-trailer combination and the robotic tractor-trailer combination.

The contribution from this variable ratio (with oversteer) mode of steering has a somewhat different character at different speeds. As the speed increases, the steering ratio will become positive and the contribution from the variable ratio with oversteer mode will become a more stable type of ratio steering, like a steerable type A dolly, increasing steering stability. As the speed decreases, the steering ratio will become negative to produce a cornering type of ratio steering including oversteer.

The controller 49 can be programmed to use any combination of the Path Tracking, and/or cornering or stability ratio steering modes under various speed and/or cornering conditions. The mixture can easily be adjusted to obtain the desired steering characteristics.

This variable ratio with oversteer mode of steering can be easily integrated with the path tracking modes of steering, since the modes all have output in the form of a $\Delta$ which is the correction to the steering angle that is needed. For example, if equal weight was given to each of the two path tracking modes (relative angle mode and rate of orientation change mode) and to the Variable Ratio with oversteer mode of steering, each type of steering would contribute roughly one-third of the total steering character. When the robotic tractor 50 is operating in this combined mode, the controller 49 will determine the steering necessary at each first robotic tractor travel interval by a calculation similar to the following:

$$\Delta FINAL=[\Delta RATIO_1+\Delta PATH_{1\_Relative\_Angle}+\Delta PATH_{1\_Rate\_of\_Orientation}]/3$$

where $\Delta RATIO_1$, $\Delta PATH_{1\_Relative\_Angle}$, and $\Delta Path_{1\_Rate\_of\_Orientation}$ are defined as above. Also, any of the modes can easily be combined with any of the other modes. For example, a simple combination of the two path tracking modes with equal weightings could be obtained by setting $$\Delta\text{FINAL} = (\Delta\text{PATH}_{1\_Relative\_Angle} + \Delta\text{Path}_{1\_Rate\_of\_Orientation})/2$$

The output from the steering modes could be weighted according to the speed of the vehicle, the steering angle of the lead tractor, the angle between any two section, under the control of the driver of the lead tractor, or using input from many different systems. The output from the steering modes could be combined using many methods, and it is expected that, they would all be covered under this invention.

Referring to the equations that were derived for the variable ratio (with oversteer) portion of the above controlling equation, we can see how this combination contributes to the stability of the system at high speeds. When CORR is near 0.6 the two path-tracking modes will be combined with a very stable form of the variable ratio mode (steering ratio positive). When CORR is closer to –4 the more maneuverable cornering mode (steering ratio negative) will be combined with the path-tracking modes.

As above, $\Delta$FINAL is the amount of steering correction needed by the axle steering system. During operation, the steering motors should act to maintain $\Delta$FINAL near zero. The value of $\Delta$FINAL controls the activation of hydraulic control valves that cause the hydraulic motor 68 (FIGS. 4, 5) to rotate the steering axle assembly 60 about its central pivot support point 58 (FIG. 3). A positive value of $\Delta$FINAL will cause the wheels to be steered more to the right of the robotic tractor centerline, and a negative $\Delta$FINAL will cause them to be steered more to the left of the robotic tractor centerline. A larger magnitude of $\Delta$FINAL will cause the valves to be opened wider or will cause more than one valve to be opened, producing more rapid steering movement.

Miscellaneous Topics

Smoothing Steering Behavior

It should be noted that if experimental error in the measurements was causing the steering to become erratic during operation, the steering response could be smoothed by simply averaging $\Delta$FINAL over several travel intervals.

Improving General Steering Response

It should also be noted that in each of the above cases, steering response could be improved by having an algorithm for the controller 49 to predict the value of the variables in the next travel interval by extrapolation of the input values for the last two or three travel intervals. It could then control the steering motors so that when the actual data for the interval was obtained, the value of $\Delta$FINAL would be minimized. Obviously, the steering response will also be improved if the controller 49 uses the smallest travel interval that it is able to use. The travel interval size could be changed occasionally as the speed changed in order to improve the response of the system at lower speeds.

Backing Mode

The behavior of the robotic tractor with path tracking steering modes, variable ratio (with oversteer) mode, and traction kinking during backing operations is of particular interest. Normally a double is almost impossible to back, but if the robotic tractor is shifted into a special stability mode (corresponding to full control by the stability portion of the variable ratio steering mode), the robotic tractor with its trailer will behave much like a single-axle trailer with a very long wheelbase. The double string will then become only slightly harder to back than a single trailer.

Multiple Robotic Tractors

It should be noted that, while the analysis presented here applies to all robotic tractors in a given truck-tractor string.

In general, with the robotic tractors incorporating the improvements of this invention, one tractor will pull and control several robotic tractors with their trailers. The algorithms for the various modes of path tracking for the second robotic tractor function the same as those for the first robotic tractor, with the sensor readings from the main tractor must be delayed longer due to the greater distance between the robotic tractor and the lead tractor.

Most of the algorithms could also be made to function for more robotic tractors by taking the readings off of the robotic tractor in front of the one being considered, instead of the lead tractor, but that would cause errors to propagate more readily. The ratio with oversteer mode must take readings from the unit directly in front of it, however combining this method with the other modes will correct for that additional error.

Length Adjustments

The length of the robotic tractor may need to be adjusted to accommodate rear trailers 58 of different lengths. This may be accomplished by loosening the pins and locks 146 and 148, sliding the inner section of the frame 74b into or out of the outer frame section 74a at joint 144, and then re-tightening the pins and locks 146 and 148.

Generality of Concept

The concepts involved in this invention are most easily explained by describing specific devices that embody or exemplify these concepts. The construction of the various sensors and control components shown in the preferred embodiment of the invention was chosen more with the intention of making each part of the invention understandable than for practicality of construction and use. More compact angle sensors and rotation sensors are readily available, and an expert in the field will quickly see that, in almost all cases, the invention could easily be constructed using any device that performs the desired function. The description of any particular embodiment of the invention is not intended in any way to limit the invention to some particular embodiment, but only to assist the reader in understanding the concepts involved in this invention. It is, therefore, to be understood that the present invention includes any embodiment that is within the scope of the claims rather than as specifically described.

We claim:

1. An articulated steerable mobile machine, comprising:
   first, second, and third machine sections, each machine section having an axle, said first machine section being independently steerable, said second machine section being non-steerable and being pivotally connected to said first machine section, and said third machine section being steerable and being pivotally connected to said second machine section;
   a first sensor to sense information about the relative or absolute orientation or the rate of change of said relative or absolute orientation in a roughly horizontal plane of the first one of said machine sections or any subsection of the first one of said machine sections or to sense information about the relative or absolute position or the rate of change of said relative or absolute position in a roughly horizontal plane or from which the relative or absolute position in a roughly horizontal plane can be derived of the first one of said machine sections or any subsection of the first one of said machine;
   a second sensor to sense information about the relative or absolute orientation or the rate of change of said relative or absolute orientation in a roughly horizontal plane of a second of said machine sections or any subsection of a second of said machine sections or to sense information about the relative or absolute position or the rate of change of said relative or absolute position in a roughly horizontal plane or from which the relative or absolute position can be derived of a second of said machine sections or any subsection of a second of said machine sections;

a control system receiving input from said first sensor and said second sensor measuring information about the relative or absolute orientation or the rate of change of said relative or absolute orientation in a roughly horizontal plane of at least two of said machine sections or of subsections of said machine sections, or receiving input from said first sensor and said second sensor measuring information about the relative or absolute position or the rate of change of said relative or absolute position in a roughly horizontal plane, or from which the relative or absolute position in a roughly horizontal plane can be derived of at least two of said machine sections or of subsections of said machine sections;

said control system using mathematical algorithms of various types to process the data acquired from said first sensor and said second sensor and to generate an output signal to control the orientation of said steerable axle mounted on said third machine section;

said control system, by the way it handles the input data in order to generate output control signals, causing the path of the third machine section to be characterized by a degree of similarity to the path of the first machine section; and wherein said first sensor comprises a means to deliver a corresponding first orientation angle signal or a first position signal to the control system; and said second sensor comprises a means to deliver a corresponding second orientation angle signal or a second position signal to the control system.

2. The articulated steerable mobile machine, as set forth in claim 1 wherein the control system also receives input from a third sensor measuring information about the distance traveled by one of the machine sections along a linear path in a roughly horizontal plane, or the speed or the acceleration of one of the machine sections along its linear path in a roughly horizontal plane, and uses this data along with the other input data to generate output control signals that cause the path of the robotic machine section to be characterized by a degree of similarity to the path of the first machine section.

3. The articulated steerable mobile machine, as set forth in either claim 1, wherein at least one additional set of data is obtained from a sensor or from some other source, and utilized by the control system.

4. An articulated mobile machine, comprising:
a first machine section, wherein said first machine section further comprises a steerable subsection having at least one axle;
a second machine section pivotally connected to said first machine section, wherein said second machine section further comprises at least one non-steered axle;
a third machine section being steerable and being pivotally connected to said second machine section, wherein said third machine section further comprises a steerable subsection having at least one axle;
a first machine section orientation data input sensor, wherein said first machine section orientation data input sensor senses reference steering information regarding the orientation of said first machine section;
a third machine section orientation data input sensor, wherein said third machine section orientation data input sensor senses comparison steering information regarding the orientation of said third machine section; and
a control system receiving data from said first machine section orientation data input sensor and said third machine section orientation data input sensor, wherein said control system processes data acquired from said first machine section orientation data input sensor and from said third machine section orientation data input sensor to generate an overall steering output to control the orientation of said steerable subsection of said third machine section in order to steer said third machine section in a desired path.

5. The articulated mobile machine, of claim 4, further comprising:
a linear motion sensor, wherein said linear motion sensor measures information from which the linear motion of a designated one of said machine sections along a linear path can be derived and transmits said information from which the linear motion of a designated one of said machine sections along a linear path can be derived to said control system.

6. The articulated mobile machine of claim 4, further comprising
a fourth machine section pivotally connected to said third machine section; wherein
said first machine section orientation data input sensor senses an orientation substantially equivalent to the relative orientation of said first machine section with respect to said second machine section; and
said third machine section orientation data input sensor senses an orientation substantially equivalent to the relative orientation of said steerable subsection of said third machine section with respect to said fourth machine section.

7. The articulated mobile machine of claim 4, further comprising
a $\theta_{D1}$ sensor to sense an orientation substantially equivalent to the relative orientation of said second machine section with respect to said third machine section; wherein
said $\theta_{D1}$ sensor generates an input to said control system;
said first machine section orientation data input sensor senses an orientation substantially equivalent to the relative orientation of said steerable subsection of said first machine section with respect to said first machine section;
said third machine section orientation data input sensor senses an orientation substantially equivalent to the relative orientation of said steerable subsection of said third machine section with respect to said third machine section; and
said control system further receives and utilizes the $\theta_{D1}$ sensor input.

8. The articulated mobile machine of claim 7 wherein said first machine section further comprises at least one non-steered axle.

9. The articulated mobile machine of claim 4, wherein
said first machine section comprises a tractor;
said second machine section comprises a semi-trailer;
said third machine section comprises a dolly-type robotic vehicle;
said steerable subsection of said first machine section comprises a front axle of said tractor; and said steerable subsection of said third machine section comprises at least one steering axle of said dolly-type robotic vehicle.

10. The articulated mobile machine of claim 4, further comprising:
   a fourth machine section pivotally connected to said third machine section; wherein
   said first machine section comprises a tractor;
   said second machine section comprises a semi-trailer;
   said third machine section comprises a dolly-type robotic vehicle;
   said fourth machine section comprises a trailer;
   said steerable subsection of said first machine section comprises a front axle of said tractor; and
   said steerable subsection of said third machine section comprises at least one steering axle of said dolly-type robotic vehicle.

11. The articulated mobile machine of claim 4, further comprising:
   a fourth machine section pivotally connected to said third machine section; wherein
   said first machine section comprises a double-axled vehicle;
   said second machine section comprises a forward single-axled trailer;
   said third machine section comprises the tongue and front wheels of a double-axled wagon-type robotic vehicle;
   said fourth machine section comprises the frame and rear wheels of said double-axled wagon-type robotic vehicle;
   said steerable subsection of said first machine section comprises a front axle of said double-axled vehicle; and
   said steerable subsection of said third machine section is said front wheels of said double-axled wagon-type robotic vehicle.

12. The articulated mobile machine of claim 5, wherein said linear motion sensor measures the distance traveled by one of said machine sections along a linear path.

13. The articulated mobile machine of claim 5, wherein said linear motion sensor measures the speed of one of said machine sections along a linear path.

14. A method for steering a trailing section of a pivotally connected articulated mobile machine, having a first machine section being independently steered with a steerable subsection, a second machine section having at least one non-steered axle, and a third machine section with a steerable subsection, said method comprising the following steps:
   determining the orientation parameter of said first machine section;
   determining the orientation parameter of said third machine section;
   processing said orientation parameter of said first machine section and said orientation parameter of said third machine section to calculate the overall steering output needed to steer said third machine section; and
   applying the overall steering output to control the orientation of said steerable subsection of said third machine section in such a way that the path of said third machine section is characterized by a degree of similarity to the path of said first machine section.

15. A method for steering a trailing section of an articulated mobile machine as in claim 14, wherein
   the orientation parameter of said first machine section is determined by measuring the orientation of said steerable subsection of said first machine section with respect to said first machine section;
   the step of determining an orientation parameter of said third machine section further includes the steps of:
      determining the orientation of said steerable subsection of said third machine section with respect to said third machine section; and
      determining the orientation of said second machine section with respect to said third machine section; and wherein
      the overall steering output is calculated utilizing said orientation of said steerable subsection of said first machine section with respect to said first machine section and said orientation of said steerable subsection of said third machine section with respect to said third machine section and said orientation of said second machine section with respect to said third machine section.

16. The steering method of claim 15, further comprising the step of
   measuring information from which the linear motion of a designated one of said machine sections along a linear path can be derived; and
   wherein the processing involved in the generation of the overall steering output utilizes the measured information from which the linear motion of a designated one of said machine sections along a linear path can be derived.

17. A method for steering a trailing section of an articulated mobile machine, having a first machine section, a second machine section, a third machine section, and a fourth machine section, wherein said second machine section is further comprised of at least one non-steered axle, and said third machine section is further comprised of a steerable subsection, said method comprising the following steps:
   determining the orientation of said first machine section with respect to said second machine section;
   determining the orientation of said steerable subsection of said third machine section with respect to said fourth machine section;
   processing said orientation of said first machine section with respect to said second machine section and said orientation of said steerable subsection of said third machine section with respect to said fourth machine sectio to calculate an overall steering output needed to steer said third machine section; and
   applying the overall steering output to control the orientation of said steerable subsection of said third machine section in such a way that the path of said third machine section is characterized by a degree of similarity to the path of said first machine section.

18. An articulated mobile machine, comprising:
   a first machine section;
   a second machine section pivotally connected to said first machine section;
   a third machine section being steerable and being pivotally connected to said second machine section;
   a means for determining reference steering information regarding the orientation of said first machine section;
   a means for determining comparison steering information regarding the orientation said third machine section;
   a means for processing said reference steering information and said comparison steering information to determine a desired steering angle for the third machine section; and wherein said first machine section further comprises a steerable subsection; and said second machine section further comprises at least one non-steered axle.

19. The articulated mobile machine of 18 wherein said third machine section further comprises a steerable subsection having at least one axle; and said articulated mobile machine further comprises:
a means for steering said steerable subsection of said third machine section in order to steer said third machine section in said desired steering angle;
a means for determining a distance traveled by a designated one of said machine sections along a linear path; and
a means for utilizing said distance traveled in the generation of said desired steering angle.

20. The articulated mobile machine of claim 19, further comprising:

a fourth machine section pivotally connected to said third machine section; wherein said reference steering information is substantially equivalent to the relative orientation of said first machine section with respect to said second machine section; and said comparison steering information is substantially equivalent to the relative orientation of said steerable subsection of said third machine section with respect to said fourth machine section.

21. The articulated mobile machine of claim 19 further comprising:

a means for determining the relative orientation of said second machine section with respect to said third machine section; and a means for processing said relative orientation of said second machine section with respect to said third machine section in the generation of said desired steering angle; wherein said reference steering information is substantially equivalent to the relative orientation of said steerable subsection of said first machine section with respect to said first machine section; and said comparison steering information is substantially equivalent to the relative orientation of said steerable subsection of said third machine section with respect to said third machine section.

* * * * *